US009252827B2

(12) United States Patent
Gudem et al.

(10) Patent No.: US 9,252,827 B2
(45) Date of Patent: Feb. 2, 2016

(54) SIGNAL SPLITTING CARRIER AGGREGATION RECEIVER ARCHITECTURE

(75) Inventors: Prasad Srinivasa Siva Gudem, San Diego, CA (US); Udara C. Fernando, San Diego, CA (US); Li-Chung Chang, Irvine, CA (US)

(73) Assignee: QUALCOMM Incorporated, San Diego, CA (US)

( * ) Notice: Subject to any disclaimer, the term of this patent is extended or adjusted under 35 U.S.C. 154(b) by 86 days.

(21) Appl. No.: 13/411,461

(22) Filed: Mar. 2, 2012

(65) Prior Publication Data

US 2012/0327825 A1 Dec. 27, 2012

Related U.S. Application Data

(60) Provisional application No. 61/501,381, filed on Jun. 27, 2011.

(51) Int. Cl.
H04B 1/3805 (2015.01)
H04B 1/00 (2006.01)

(52) U.S. Cl.
CPC .............. *H04B 1/3805* (2013.01); *H04B 1/005* (2013.01)

(58) Field of Classification Search
USPC .................... 455/313, 323, 73; 375/219, 332; 370/310
See application file for complete search history.

(56) References Cited

U.S. PATENT DOCUMENTS

| 3,911,364 | A | 10/1975 | Langseth et al. |
| 4,035,728 | A | 7/1977 | Ishikawa et al. |
| 4,035,729 | A | 7/1977 | Perry |
| 4,246,655 | A | 1/1981 | Parker |
| 4,326,294 | A | 4/1982 | Okamoto et al. |

(Continued)

FOREIGN PATENT DOCUMENTS

| CN | 1523912 A | 8/2004 |
| CN | 1922795 A | 2/2007 |

(Continued)

OTHER PUBLICATIONS

Aparin et al., "A Highly-integrated tri-band/quad-mode SiGe BiCMOS RF-to-baseband and receiver for wireless CDMA/WCDMA/AMPS applications with GPS capability", Solid-State Circuits Conference, 2002. Digest of Technical Papers. 2002 IEEE International Feb. 3-7, 2002, Piscataway, NJ, USA, IEEE, vol. 1, 2002, pp. 234-235, XP010585547, ISBN: 0-7803-7335-9.

(Continued)

*Primary Examiner* — Khaled Kassim
*Assistant Examiner* — Zhaohui Yang
(74) *Attorney, Agent, or Firm* — James T. Gutierrez

(57) ABSTRACT

A wireless communication device configured for receiving a multiple carrier signal is described. The wireless communication device includes a primary signal splitting carrier aggregation architecture. The primary signal splitting carrier aggregation architecture includes a primary antenna and a transceiver chip. The primary signal splitting carrier aggregation architecture reuses a first diversity/simultaneous hybrid dual receiver path. The wireless communication device also includes a secondary signal splitting carrier aggregation architecture. The secondary signal splitting carrier aggregation architecture includes a secondary antenna and a receiver chip. The secondary signal splitting carrier aggregation architecture reuses a second diversity/simultaneous hybrid dual receiver path.

40 Claims, 15 Drawing Sheets

(56) References Cited

U.S. PATENT DOCUMENTS

| | | | |
|---|---|---|---|
| 4,715,048 A | 12/1987 | Masamura | |
| 4,742,563 A | 5/1988 | Fukumura | |
| 4,756,023 A | 7/1988 | Kojima | |
| 4,969,207 A | 11/1990 | Sakamoto et al. | |
| 5,056,411 A | 10/1991 | Baker | |
| 5,128,630 A | 7/1992 | Mijuskovic | |
| 5,291,519 A | 3/1994 | Tsurumaru | |
| 5,321,850 A | 6/1994 | Backstrom et al. | |
| 5,345,601 A | 9/1994 | Takagi et al. | |
| 5,390,342 A | 2/1995 | Takayama et al. | |
| 5,559,838 A | 9/1996 | Nakagoshi | |
| 5,566,364 A | 10/1996 | Mizoguchi et al. | |
| 5,694,396 A | 12/1997 | Firouzbakht et al. | |
| 5,697,083 A | 12/1997 | Sano | |
| 5,761,613 A | 6/1998 | Saunders et al. | |
| 5,794,159 A | 8/1998 | Portin | |
| 5,805,643 A | 9/1998 | Seki et al. | |
| 5,805,989 A | 9/1998 | Ushida | |
| 5,835,853 A | 11/1998 | Enoki et al. | |
| 5,940,452 A | 8/1999 | Rich | |
| 5,999,815 A | 12/1999 | TenBrook et al. | |
| 5,999,990 A | 12/1999 | Sharrit et al. | |
| 6,026,288 A | 2/2000 | Bronner | |
| 6,040,732 A | 3/2000 | Brokaw | |
| 6,044,254 A | 3/2000 | Ohta et al. | |
| 6,063,961 A | 5/2000 | Kroner | |
| 6,069,923 A | 5/2000 | Ostman et al. | |
| 6,088,348 A | 7/2000 | Bell, III et al. | |
| 6,208,844 B1 | 3/2001 | Abdelgany | |
| 6,249,687 B1 | 6/2001 | Thomsen et al. | |
| 6,407,689 B1 | 6/2002 | Bazarjani et al. | |
| 6,424,683 B1 | 7/2002 | Schollhorn | |
| 6,430,237 B1 | 8/2002 | Anvari | |
| 6,472,947 B1 | 10/2002 | Zeitz | |
| 6,473,601 B1 | 10/2002 | Oda | |
| 6,522,895 B1 | 2/2003 | Montalvo | |
| 6,535,725 B2 | 3/2003 | Hatcher et al. | |
| 6,600,759 B1 | 7/2003 | Wood | |
| 6,600,907 B1 | 7/2003 | Taguchi | |
| 6,600,931 B2 | 7/2003 | Sutton et al. | |
| 6,657,498 B2 | 12/2003 | Park et al. | |
| 6,806,777 B2 | 10/2004 | Franca-Neto | |
| 6,819,941 B2 | 11/2004 | Dening et al. | |
| 6,888,888 B1 | 5/2005 | Tu et al. | |
| 6,952,594 B2 | 10/2005 | Hendin | |
| 6,954,446 B2 | 10/2005 | Kuffner | |
| 6,983,132 B2 | 1/2006 | Woo et al. | |
| 6,985,712 B2 | 1/2006 | Yamakawa et al. | |
| 6,987,950 B2 | 1/2006 | Coan | |
| 7,013,166 B2 | 3/2006 | Clifford | |
| 7,023,272 B2 | 4/2006 | Hung et al. | |
| 7,024,172 B1 | 4/2006 | Murphy et al. | |
| 7,039,377 B2 | 5/2006 | Yates | |
| 7,123,891 B2 | 10/2006 | Loke | |
| 7,142,042 B1 | 11/2006 | Henry | |
| 7,161,423 B2 | 1/2007 | Paul et al. | |
| 7,167,044 B2 | 1/2007 | Li et al. | |
| 7,187,239 B2 | 3/2007 | Yeh | |
| 7,187,735 B2 | 3/2007 | Kent, III et al. | |
| 7,187,904 B2 | 3/2007 | Gainey et al. | |
| 7,212,788 B2 | 5/2007 | Weber et al. | |
| 7,224,231 B2 | 5/2007 | Wu | |
| 7,260,377 B2 | 8/2007 | Burns et al. | |
| 7,283,851 B2 | 10/2007 | Persico et al. | |
| 7,299,021 B2 | 11/2007 | P rssinen et al. | |
| 7,313,368 B2 | 12/2007 | Wu et al. | |
| 7,317,894 B2 | 1/2008 | Hirose | |
| 7,333,831 B2 | 2/2008 | Srinivasan et al. | |
| 7,356,325 B2* | 4/2008 | Behzad et al. | 455/323 |
| 7,372,336 B2 | 5/2008 | Lee et al. | |
| 7,403,508 B1 | 7/2008 | Miao | |
| 7,444,166 B2 | 10/2008 | Sahota | |
| 7,454,181 B2 | 11/2008 | Banister et al. | |
| 7,477,106 B2 | 1/2009 | Van Bezooijen et al. | |
| 7,486,135 B2 | 2/2009 | Mu | |
| 7,570,111 B1 | 8/2009 | Vagher et al. | |
| 7,599,675 B2 | 10/2009 | Mu et al. | |
| 7,643,847 B2 | 1/2010 | Daanen et al. | |
| 7,643,848 B2 | 1/2010 | Robinett | |
| 7,697,905 B2 | 4/2010 | Lee et al. | |
| 7,728,664 B2 | 6/2010 | Chang et al. | |
| 7,751,513 B2 | 7/2010 | Eisenhut et al. | |
| 7,764,726 B2 | 7/2010 | Simic et al. | |
| 7,848,724 B2 | 12/2010 | Bult et al. | |
| 7,869,528 B2 | 1/2011 | Robinson | |
| 7,877,075 B1 | 1/2011 | Jin et al. | |
| 7,911,269 B2 | 3/2011 | Yang et al. | |
| 7,944,298 B2 | 5/2011 | Cabanillas et al. | |
| 7,949,309 B2 | 5/2011 | Rofougaran et al. | |
| 7,952,398 B2 | 5/2011 | Salcido et al. | |
| 8,022,772 B2 | 9/2011 | Cassia et al. | |
| 8,055,229 B2 | 11/2011 | Huang | |
| 8,063,706 B2 | 11/2011 | Li et al. | |
| 8,081,672 B2 | 12/2011 | Kent et al. | |
| 8,090,332 B2 | 1/2012 | Sahota et al. | |
| 8,090,369 B2 | 1/2012 | Kitazoe | |
| 8,139,670 B1 | 3/2012 | Son et al. | |
| 8,149,955 B2 | 4/2012 | Tired | |
| 8,195,117 B2 | 6/2012 | Bult et al. | |
| 8,208,887 B2 | 6/2012 | Lee et al. | |
| 8,217,723 B2 | 7/2012 | Rajendran et al. | |
| 8,242,841 B2 | 8/2012 | Zhang | |
| 8,270,927 B2 | 9/2012 | Wallace et al. | |
| 8,290,449 B2 | 10/2012 | Keehr et al. | |
| 8,295,778 B2 | 10/2012 | Kotecha et al. | |
| 8,306,494 B2 | 11/2012 | Ojo | |
| 8,442,473 B1 | 5/2013 | Kaukovuori et al. | |
| 8,514,015 B2 | 8/2013 | Chen | |
| 8,571,510 B2 | 10/2013 | Liu et al. | |
| 8,600,315 B2 | 12/2013 | Roufoogaran et al. | |
| 8,626,084 B2 | 1/2014 | Chan et al. | |
| 8,676,148 B2 | 3/2014 | Ogasawara | |
| 8,706,069 B2 | 4/2014 | Khoini-Poorfard et al. | |
| 2002/0008575 A1 | 1/2002 | Oskowsky et al. | |
| 2002/0061773 A1 | 5/2002 | Adachi et al. | |
| 2002/0111163 A1 | 8/2002 | Hamabe | |
| 2002/0132597 A1 | 9/2002 | Peterzell et al. | |
| 2002/0173337 A1 | 11/2002 | Hajimiri et al. | |
| 2002/0193108 A1 | 12/2002 | Robinett | |
| 2003/0076797 A1 | 4/2003 | Lozano | |
| 2003/0081694 A1 | 5/2003 | Wieck | |
| 2003/0125040 A1 | 7/2003 | Walton et al. | |
| 2003/0148750 A1 | 8/2003 | Yan et al. | |
| 2003/0157915 A1 | 8/2003 | Atkinson et al. | |
| 2003/0176176 A1 | 9/2003 | Leinonen et al. | |
| 2003/0203743 A1 | 10/2003 | Sugar et al. | |
| 2003/0206076 A1 | 11/2003 | Hashemi et al. | |
| 2003/0228851 A1 | 12/2003 | Taniguchi | |
| 2004/0087290 A1 | 5/2004 | Schmidt et al. | |
| 2004/0092243 A1 | 5/2004 | Hey-Shipton | |
| 2004/0113746 A1 | 6/2004 | Brindle | |
| 2004/0116086 A1 | 6/2004 | Huttunen | |
| 2004/0121753 A1 | 6/2004 | Sugar et al. | |
| 2004/0204104 A1 | 10/2004 | Horng et al. | |
| 2004/0219959 A1 | 11/2004 | Khayrallah et al. | |
| 2004/0224643 A1 | 11/2004 | Nakai | |
| 2004/0253955 A1 | 12/2004 | Love et al. | |
| 2004/0266356 A1 | 12/2004 | Javor et al. | |
| 2005/0039060 A1 | 2/2005 | Okayasu | |
| 2005/0075077 A1 | 4/2005 | Mach et al. | |
| 2005/0079847 A1 | 4/2005 | Arafa | |
| 2005/0118977 A1 | 6/2005 | Drogi et al. | |
| 2005/0197090 A1* | 9/2005 | Stockstad et al. | 455/313 |
| 2005/0215264 A1 | 9/2005 | Subramaniam et al. | |
| 2005/0265084 A1 | 12/2005 | Choi | |
| 2005/0277387 A1 | 12/2005 | Kojima et al. | |
| 2006/0009177 A1 | 1/2006 | Persico et al. | |
| 2006/0023745 A1 | 2/2006 | Koo et al. | |
| 2006/0061773 A1 | 3/2006 | Lee et al. | |
| 2006/0121937 A1 | 6/2006 | Son | |
| 2006/0128322 A1 | 6/2006 | Igarashi et al. | |
| 2006/0146693 A1 | 7/2006 | Mori et al. | |
| 2006/0189286 A1 | 8/2006 | Kyu et al. | |
| 2006/0222100 A1 | 10/2006 | Behzad | |

(56) References Cited

U.S. PATENT DOCUMENTS

| | | |
|---|---|---|
| 2006/0234662 A1 | 10/2006 | Diloisy |
| 2006/0291428 A1 | 12/2006 | Filipovic |
| 2007/0049332 A1 | 3/2007 | Higuchi |
| 2007/0060080 A1 | 3/2007 | Nishimura et al. |
| 2007/0072577 A1 | 3/2007 | Rozenblit et al. |
| 2007/0105517 A1 | 5/2007 | Chang et al. |
| 2007/0142013 A1 | 6/2007 | Bucknor et al. |
| 2007/0177656 A1 | 8/2007 | Maruta et al. |
| 2007/0177693 A1* | 8/2007 | Kluge ............................ 375/332 |
| 2007/0184801 A1 | 8/2007 | Kogawa et al. |
| 2007/0197170 A1 | 8/2007 | Boos |
| 2007/0197178 A1 | 8/2007 | Gu |
| 2007/0197204 A1 | 8/2007 | Herczog et al. |
| 2007/0202890 A1 | 8/2007 | Feher |
| 2007/0242784 A1 | 10/2007 | Sampson et al. |
| 2007/0243832 A1 | 10/2007 | Park et al. |
| 2007/0262817 A1 | 11/2007 | Ciccarelli et al. |
| 2007/0262871 A1 | 11/2007 | Yamagajo et al. |
| 2008/0004078 A1 | 1/2008 | Barratt et al. |
| 2008/0013654 A1 | 1/2008 | Rick et al. |
| 2008/0117999 A1 | 5/2008 | Kadous et al. |
| 2008/0139151 A1 | 6/2008 | Ojo et al. |
| 2008/0204148 A1 | 8/2008 | Kim et al. |
| 2008/0224770 A1 | 9/2008 | Kim et al. |
| 2008/0224791 A1 | 9/2008 | Cheng |
| 2008/0225971 A1 | 9/2008 | Behzad |
| 2008/0261650 A1 | 10/2008 | Piriyapoksombut et al. |
| 2009/0124227 A1 | 5/2009 | Ishiguro |
| 2009/0227214 A1 | 9/2009 | Georgantas et al. |
| 2009/0237161 A1 | 9/2009 | Fagg |
| 2009/0243869 A1 | 10/2009 | Sanderford, Jr. |
| 2009/0253456 A1 | 10/2009 | Toh et al. |
| 2009/0290659 A1 | 11/2009 | Petrovic et al. |
| 2009/0323779 A1 | 12/2009 | Lennen |
| 2010/0019970 A1 | 1/2010 | Farrokhi et al. |
| 2010/0034094 A1 | 2/2010 | Tenny |
| 2010/0040178 A1 | 2/2010 | Sutton et al. |
| 2010/0142440 A1* | 6/2010 | Inoue ............................ 370/328 |
| 2010/0195754 A1 | 8/2010 | Li et al. |
| 2010/0197263 A1 | 8/2010 | Dwyer et al. |
| 2010/0210226 A1 | 8/2010 | Matsuyama |
| 2010/0210272 A1 | 8/2010 | Sundstrom et al. |
| 2010/0210299 A1 | 8/2010 | Gorbachov |
| 2010/0214184 A1 | 8/2010 | Tran et al. |
| 2010/0225414 A1 | 9/2010 | Gorbachov |
| 2010/0226327 A1 | 9/2010 | Zhang et al. |
| 2010/0232493 A1 | 9/2010 | Thirumoorthy |
| 2010/0237947 A1 | 9/2010 | Xiong et al. |
| 2010/0253435 A1 | 10/2010 | Ichitsubo et al. |
| 2010/0265875 A1 | 10/2010 | Zhao et al. |
| 2010/0271986 A1 | 10/2010 | Chen |
| 2010/0272051 A1 | 10/2010 | Fu et al. |
| 2010/0301946 A1 | 12/2010 | Borremans |
| 2010/0311378 A1 | 12/2010 | Tasic et al. |
| 2010/0328155 A1 | 12/2010 | Simic et al. |
| 2010/0330977 A1 | 12/2010 | Kadous et al. |
| 2011/0018635 A1 | 1/2011 | Tasic et al. |
| 2011/0044380 A1 | 2/2011 | Marra et al. |
| 2011/0050319 A1 | 3/2011 | Wong |
| 2011/0084791 A1 | 4/2011 | Mun et al. |
| 2011/0086603 A1 | 4/2011 | Toosi et al. |
| 2011/0110463 A1 | 5/2011 | Chang et al. |
| 2011/0122972 A1 | 5/2011 | Lie et al. |
| 2011/0165848 A1 | 7/2011 | Gorbachov et al. |
| 2011/0193625 A1 | 8/2011 | Gatta et al. |
| 2011/0194504 A1 | 8/2011 | Gorokhov et al. |
| 2011/0204973 A1 | 8/2011 | Hu et al. |
| 2011/0211533 A1 | 9/2011 | Casaccia et al. |
| 2011/0217945 A1 | 9/2011 | Uehara et al. |
| 2011/0222443 A1 | 9/2011 | Khlat |
| 2011/0222444 A1 | 9/2011 | Khlat et al. |
| 2011/0242999 A1 | 10/2011 | Palanki et al. |
| 2011/0250926 A1 | 10/2011 | Wietfeldt et al. |
| 2011/0268048 A1 | 11/2011 | Toskala et al. |
| 2011/0268232 A1 | 11/2011 | Park et al. |
| 2011/0292844 A1 | 12/2011 | Kwun et al. |
| 2011/0299434 A1 | 12/2011 | Gudem et al. |
| 2011/0300810 A1 | 12/2011 | Mikhemar et al. |
| 2012/0009886 A1 | 1/2012 | Poulin |
| 2012/0013387 A1 | 1/2012 | Sankaranarayanan et al. |
| 2012/0026862 A1 | 2/2012 | Sadri et al. |
| 2012/0044927 A1 | 2/2012 | Pan et al. |
| 2012/0056681 A1 | 3/2012 | Lee |
| 2012/0057621 A1 | 3/2012 | Hong et al. |
| 2012/0195237 A1 | 8/2012 | Chan et al. |
| 2012/0236829 A1 | 9/2012 | Takano et al. |
| 2012/0293265 A1 | 11/2012 | Heikkinen et al. |
| 2012/0294299 A1 | 11/2012 | Fernando |
| 2012/0327825 A1 | 12/2012 | Gudem et al. |
| 2012/0329395 A1 | 12/2012 | Husted et al. |
| 2013/0003617 A1 | 1/2013 | Gudem et al. |
| 2013/0003783 A1 | 1/2013 | Gudem et al. |
| 2013/0043946 A1 | 2/2013 | Hadjichristos et al. |
| 2013/0051284 A1 | 2/2013 | Khlat |
| 2013/0114769 A1 | 5/2013 | Fernando |
| 2013/0163492 A1 | 6/2013 | Wong |
| 2013/0217398 A1 | 8/2013 | Winiecki et al. |
| 2013/0230080 A1 | 9/2013 | Gudem et al. |
| 2013/0231064 A1 | 9/2013 | Gudem et al. |
| 2013/0265892 A1 | 10/2013 | Fernando |
| 2013/0315348 A1 | 11/2013 | Tasic et al. |
| 2013/0316668 A1 | 11/2013 | Davierwalla et al. |
| 2013/0316669 A1 | 11/2013 | Davierwalla et al. |
| 2013/0316670 A1 | 11/2013 | Tasic et al. |
| 2013/0329665 A1 | 12/2013 | Kadous et al. |
| 2014/0072001 A1 | 3/2014 | Chang et al. |
| 2014/0113578 A1 | 4/2014 | Xu |
| 2014/0269853 A1 | 9/2014 | Gudem et al. |

FOREIGN PATENT DOCUMENTS

| | | |
|---|---|---|
| CN | 101228702 A | 7/2008 |
| CN | 101242158 A | 8/2008 |
| CN | 101523967 A | 9/2009 |
| CN | 101789805 A | 7/2010 |
| EP | 1164719 A1 | 12/2001 |
| EP | 1370012 | 12/2003 |
| EP | 1398887 A1 | 3/2004 |
| EP | 1708372 A2 | 10/2006 |
| EP | 1726098 A1 | 11/2006 |
| EP | 1748567 A2 | 1/2007 |
| EP | 1761076 A2 | 3/2007 |
| EP | 2068583 A1 | 6/2009 |
| EP | 2141818 A1 | 1/2010 |
| EP | 1916767 B1 | 12/2010 |
| EP | 2393205 A2 | 12/2011 |
| EP | 2398285 A1 | 12/2011 |
| GB | 2472978 A | 3/2011 |
| JP | 05227234 | 9/1993 |
| JP | H0730452 A | 1/1995 |
| JP | 07221684 | 8/1995 |
| JP | 9027778 A | 1/1997 |
| JP | 09116458 | 5/1997 |
| JP | H11127300 A | 5/1999 |
| JP | 2000013278 A | 1/2000 |
| JP | 2001285114 | 10/2001 |
| JP | 2002261880 A | 9/2002 |
| JP | 2004015162 A | 1/2004 |
| JP | 2006520143 A | 8/2006 |
| JP | 2007324711 A | 12/2007 |
| JP | 2008085793 A | 4/2008 |
| JP | 2008519535 A | 6/2008 |
| JP | 2009027778 | 2/2009 |
| JP | 2009130867 A | 6/2009 |
| JP | 2011015112 A | 1/2011 |
| JP | 2011082669 A | 4/2011 |
| JP | 2011091747 A | 5/2011 |
| JP | 2011119807 A | 6/2011 |
| WO | WO0150636 | 7/2001 |
| WO | 0237686 | 5/2002 |
| WO | WO2005039060 | 4/2005 |
| WO | 2005062477 A2 | 7/2005 |
| WO | WO2005064816 A1 | 7/2005 |
| WO | 2005088847 A1 | 9/2005 |

(56) References Cited

FOREIGN PATENT DOCUMENTS

| WO | 2006050515 A2 | 5/2006 |
|----|---------------|--------|
| WO | 2006118538 A2 | 11/2006 |
| WO | 2008059257 A1 | 5/2008 |
| WO | 2008084539 A1 | 7/2008 |
| WO | 2008092745 A1 | 8/2008 |
| WO | 2008103757    | 8/2008 |
| WO | 2008145604 A1 | 12/2008 |
| WO | 2010059257 A1 | 5/2010 |
| WO | 2011019850 A1 | 2/2011 |
| WO | 2011050729 A1 | 5/2011 |
| WO | 2011092005 A1 | 8/2011 |
| WO | 2011138697 A1 | 11/2011 |
| WO | 2012008705 A2 | 1/2012 |
| WO | 2012049529 A1 | 4/2012 |
| WO | 2013036794 A1 | 3/2013 |
| WO | 2013131047    | 9/2013 |

OTHER PUBLICATIONS

Hwang, et al., "A High IIP2 Direct-Conversion Receiver using Even-Harmonic Reduction Technique for Cellular CDMA/PCS/GPS applications," IEEE Transaction on Circuits and Systems.

MSM6500 Chipset Solution, Qualcomm Incorporated.

Sever et al. "A Dual-Antenna Phase-Array Ultra-Wideband CMOS Transceiver". IEEE Communications Magazine [Online] 2006, vol. 44, Issue 8, pp. 102-110. See pp. 104-107.

Winternitz, et al., "A GPS Receiver for High-Altitude Satellite Navigation," IEEE Journal of Selected Topics in Signal Processing, vol. 3, No. 4, pp. 541-556, Aug. 2009.

3GPP TS 36.101 V11.0.0, 3rd Generation Partnership Project; Technical Specification Group Radio Access Network; Evolved Universal Terrestrial Radio Access (E-UTRA); User Equipment (UE) radio transmission and reception (Release 11), Mar. 2012.

Broyde F., et al., "The Noise Performance of aMultiple-Input-Port and Multiple-Output-Port Low-Noise Amplifier Connected to an Array of Coupled Antennas," International Journal of Antennas and Propagation, vol. 2011, Article ID 438478, Jul. 18, 2011, 12 pages.

Chen, et al, "A 5-6 GHz 1-V CMOS Direct-Conversion Receiver With an Integrated Quadrature Coupler," IEEE Journal of Solid-State Circuits, vol. 42, No. 9, 2007, pp. 1963-1975.

Chen, et al., "A monolithic 5.9-GHz CMOS I/Q direct-down converter utilizing a quadrature coupler and transformer-coupled subharmonic mixers," Microwave and Wireless Components Letters, IEEE , vol. 16, No. 4, 2006, pp. 197-199.

Garuda, et al., "A Multi-band CMOS RF Front-end for 4G WiMAX and WLAN Applications," 2006 IEEE International Symposium on Circuits and Systes, 2006. ISCAS 2006. May 2006, 4 pages.

Hashemi, et al., "Concurrent Multiband Low-Noise Amplifiers—Theory, Design, and Applications," IEEE Transactions on Microwave Theory and Techniques, vol. 50, No. 1, Jan. 2002.

Henrik M et al., "A Full Duplex Front End Module for WiFi 802.11.n. Applications", European Microwave Association, vol. 12, No. 4, Oct. 2008, pp. 162-165.

International Search Report and Written Opinion—PCT/US2012/044473—ISA/EPO—Jan. 15, 2013.

Jones W. W., et al., "Narrowband interference suppression using filter-bank analysis/synthesis techniques", Military Communications Conference, 1992. MILC0M '92, Conference Recor D. Communications—Fusing Command, Control and Intelligence., IEEE San Diego, CA, USA, Oct. 11-14, 1992, New York, NY, USA, IEEE, US, Oct. 11, 1992, pp. 898-902, XP010060840, DOI: 10.1109/MILCOM.1992.243977, ISBN: 978-0-7803-0585-4.

Jussi R et al., "A Dual-Band RF Front-End for WCDMA and GSM Applications", IEEE, Journal Solid-State Circuits, 2001, vol. 36, No. 8, pp. 1198-1204.

Kevin W et al., "3G/4G Multimode Cellular Front End Challenges", Part 2: Architecture Discussion, RFMD® White Paper, 9 pages.

Kim, T.W., et al., Highly Linear Receiver Front-End Adopting MOSFET Transconductance Linearization by Multiple Gated Transistors, IEEE Journal of Solid-State Circuits, United States, IEEE, Jan. 1, 2004, vol. 39, No. 1, pp. 223-229.

Lai, C.M.,et al., "Compact router transceiver architecture for carrier aggregation systems", Microwave Conference (EUMC), 2011 41st European, IEEE, Oct. 10, 2011, pp. 693-696, XP032072825, ISBN: 978-1-61284-235-6 the whole document.

Lee et al., "Development of Miniature Quad SAW filter bank based on PCB substrate", IEEE Intl Frequency Control Symp, pp. 146-149, 2007.

MSM6000 Chipset Solution, Qualcomm Incorporated.

Philips: "Capabilities of multi-transceiver UES", 3GPP Draft; R1-103913, 3rd Generation Partnership Project (3GPP), Mobile Competence Centre; 650, Route Des Lucioles; F-06921 Sophia-Antipolis Cedex; France, vol. RAN WG1, No. Dresden, Germany; 20100628, Jun. 22, 2010, XP050449298, [retrieved on Jun. 22, 2010] the whole document.

Pitschi M. et al., "High Performance Microwave Acoustic Components for Mobile Radios", Ultrasonics Symposium (IUS), 2009 IEEE International, EPCOS AG, Munich, Germany, vol. 1, Sep. 20-23, 2009.

Qualcomm Europe: "UE Implementation Impact due to 4C-HSDPA Operation", 3GPP Draft; R1-094067_UE_IMPL_IMPACT_4C_HSDPA, 3rd Generation Partnership Project (3GPP), Mobile Competence Centre; 650, Route Des Lucioles; F-06921 Sophia-Antipolis Cedex ; France, No. Miyazaki; 20091012, Oct. 12, 2009, XP050388547, [retrieved on Oct. 6, 2009].

Rahn D.G., et al., "A fully integrated multiband MIMO WLAN transceiver RFIC," IEEE J. Solid-State Circuits, 2005, vol. 40 (8), 1629-1641.

Tasic A. et al., "Design of Adaptive Multimode RF Front-End Circuits", IEEE Journal of Solid-State Circuits, vol. 42, Issue 2, Feb. 2007 pp. 313-322.

"UMTS Picocell Front End Module", CTS Corp. 8 pages.

\* cited by examiner

SIGNAL SPLITTING CARRIER AGGREGATION RECEIVER ARCHITECTURE

RELATED APPLICATIONS

This application is related to and claims priority from U.S. Provisional Patent Application Ser. No. 61/501,381 filed Jun. 27, 2011, for "CURRENT STEERING CARRIER AGGREGATION RECEIVER ARCHITECTURE."

TECHNICAL FIELD

The present disclosure relates generally to wireless devices for communication systems. More specifically, the present disclosure relates to systems and methods for a signal splitting carrier aggregation receiver architecture.

BACKGROUND

Electronic devices (cellular telephones, wireless modems, computers, digital music players, Global Positioning System units, Personal Digital Assistants, gaming devices, etc.) have become a part of everyday life. Small computing devices are now placed in everything from automobiles to housing locks. The complexity of electronic devices has increased dramatically in the last few years. For example, many electronic devices have one or more processors that help control the device, as well as a number of digital circuits to support the processor and other parts of the device.

These electronic devices may communicate wirelessly with each other and with a network. As the demand for information by these electronic devices has increased, the downlink throughput has also increased. One such way to increase downlink throughput is the use of carrier aggregation. In carrier aggregation, multiple carriers may be aggregated on the physical layer to provide the required bandwidth (and thus the required throughput).

It may be desirable for an electronic device to maximize battery life. Because an electronic device often runs on a battery with a limited operation time, reductions in the power consumption of an electronic device may increase the desirability and functionality of the electronic device.

The electronic devices have also become smaller and cheaper. To facilitate both the decrease in size and the decrease in cost, additional circuitry and more complex circuitry are being used on integrated circuits. Thus, any reduction in the die area used by circuitry may reduce both the size and cost of an electronic device. Benefits may be realized by improvements to electronic devices that allow an electronic device to participate in carrier aggregation while minimizing the cost and size of the electronic device while also minimizing the power consumption of the electronic device.

SUMMARY

A wireless communication device configured for receiving a multiple carrier signal is described. The wireless communication device includes a primary signal splitting carrier aggregation architecture that includes a primary antenna and a transceiver chip. The primary signal splitting carrier aggregation architecture reuses a first diversity/simultaneous hybrid dual receiver path. The wireless communication device also includes a secondary signal splitting carrier aggregation architecture that includes a secondary antenna and a receiver chip. The secondary signal splitting carrier aggregation architecture reuses a second diversity/simultaneous hybrid dual receiver path.

The primary signal splitting carrier aggregation architecture and the secondary signal splitting carrier aggregation architecture may not require four antennas, a power splitter, an external low noise amplifier or die-to-die signal routing. The transceiver chip may include a transmitter, a first primary receiver and a first secondary receiver. The receiver chip may include a second primary receiver and a second secondary receiver. Each receiver may include multiple low noise amplifiers for a first band and multiple low noise amplifiers for a second band. Each low noise amplifier may include a first stage amplifier and a second stage amplifier.

The first stage amplifier may be a transconductance stage and the second stage amplifier may be a cascode stage. In one configuration, the first band may be a low band and the second band may be a mid band. In another configuration, the first band may be a low band and the second band may be a high band. In yet another configuration, the first band may be a mid band and the second band may be a high band.

A first routing may be used from the primary antenna through the first primary receiver to obtain a first primary inphase/quadrature signal. A second routing may be used from the primary antenna through the first secondary receiver to obtain a first secondary inphase/quadrature signal. A third routing may be used from the secondary antenna through the second primary receiver to obtain a second primary inphase/quadrature signal. A fourth routing may be used from the secondary antenna through the second secondary receiver to obtain a second secondary inphase/quadrature signal.

The primary signal splitting carrier aggregation architecture and the secondary signal splitting carrier aggregation architecture may be in inter-band operation. The second routing may pass through a first signal splitting stage. The fourth routing may pass through a second signal splitting stage.

The first signal splitting stage may route a signal output from a first stage amplifier in a first band low noise amplifier of the first primary receiver to a second stage amplifier in a second band low noise amplifier of the first secondary receiver. The second signal splitting stage may route a signal output from a first stage amplifier in a first band low noise amplifier of the second primary receiver to a second stage amplifier in a second band low noise amplifier of the second secondary receiver.

The first signal splitting stage may route a signal output from a second stage amplifier in a first band low noise amplifier of the first primary receiver to a mixer in the first secondary receiver. The second signal splitting stage may route a signal output from a second stage amplifier in a first band low noise amplifier of the second primary receiver to a mixer in the second secondary receiver.

The primary signal splitting carrier aggregation architecture and the secondary signal splitting carrier aggregation architecture may be in intra-band operation. The second routing may pass through a first signal splitting stage. The fourth routing may pass through a second signal splitting stage. The first signal splitting stage may split a signal output from a first stage amplifier in a first band low noise amplifier of the first primary receiver, route the signal to a second stage amplifier in the first band low noise amplifier of the first primary receiver and route the signal to a second stage amplifier in a second band low noise amplifier of the first secondary receiver. The second signal splitting stage may split a signal output from a first stage amplifier in a first band low noise amplifier of the second primary receiver, route the signal to a second stage amplifier in the first band low noise amplifier of the second primary receiver and route the signal to a second stage amplifier in a second band low noise amplifier of the second secondary receiver.

The first signal splitting stage may split a signal output from a second stage amplifier in a first band low noise amplifier of the first primary receiver, route the signal to a first mixer of the first primary receiver and route the signal to a second mixer of the second primary receiver. The second signal splitting stage may split a signal output from a second stage amplifier in a first band low noise amplifier of the second primary receiver, route the signal to a first mixer of the second primary receiver and route the signal to a second mixer of the second primary receiver.

A method for receiving a multiple carrier signal using a primary signal splitting carrier aggregation architecture and a secondary signal splitting carrier aggregation architecture is also described. A first signal is received using a primary antenna. The first signal is routed through a first primary receiver on a transceiver chip in the primary signal splitting carrier aggregation architecture to obtain a first primary inphase/quadrature signal. The first signal is routed through a first secondary receiver on the transceiver chip to obtain a first secondary inphase/quadrature signal. A second signal is received using a secondary antenna. The second signal is routed through a second primary receiver on a receiver chip in the secondary signal splitting carrier aggregation architecture to obtain a second primary inphase/quadrature signal. The first signal is routed through a second secondary receiver on the receiver chip to obtain a second secondary inphase/quadrature signal.

An apparatus for receiving a multiple carrier signal using a primary signal splitting carrier aggregation architecture and a secondary signal splitting carrier aggregation architecture is described. The apparatus includes means for receiving a first signal using a primary antenna. The apparatus also includes means for routing the first signal through a first primary receiver on a transceiver chip in the primary signal splitting carrier aggregation architecture to obtain a first primary inphase/quadrature signal. The apparatus further includes means for routing the first signal through a first secondary receiver on the transceiver chip to obtain a first secondary inphase/quadrature signal. The apparatus also includes means for receiving a second signal using a secondary antenna. The apparatus further includes means for routing the second signal through a second primary receiver on a receiver chip in the secondary signal splitting carrier aggregation architecture to obtain a second primary inphase/quadrature signal. The apparatus also includes means for routing the first signal through a second secondary receiver on the receiver chip to obtain a second secondary inphase/quadrature signal.

DETAILED DESCRIPTION

The $3^{rd}$ Generation Partnership Project (3GPP) is a collaboration between groups of telecommunications associations that aims to define a globally applicable $3^{rd}$ generation (3G) mobile phone specification. 3GPP Long Term Evolution (LTE) is a 3GPP project aimed at improving the Universal Mobile Telecommunications System (UMTS) mobile phone standard. The 3GPP may define specifications for the next generation of mobile networks, mobile systems and mobile devices. In 3GPP LTE, a mobile station or device may be referred to as a "user equipment" (UE).

3GPP specifications are based on evolved Global System for Mobile Communications (GSM) specifications, which are generally known as the Universal Mobile Telecommunications System (UMTS). 3GPP standards are structured as releases. Discussion of 3GPP thus frequently refers to the functionality in one release or another. For example, Release 99 specifies the first UMTS third generation (3G) networks, incorporating a CDMA air interface. Release 6 integrates operation with wireless local area networks (LAN) networks and adds High Speed Uplink Packet Access (HSUPA). Release 8 introduces dual downlink carriers and Release 9 extends dual carrier operation to uplink for UMTS.

CDMA2000 is a family of $3^{rd}$ generation (3G) technology standards that use code division multiple access (CDMA) to send voice, data and signaling between wireless devices. CDMA2000 may include CDMA2000 1X, CDMA2000 EV-DO Rev. 0, CDMA2000 EV-DO Rev. A and CDMA2000 EV-DO Rev. B. 1x or 1xRTT refers to the core CDMA2000 wireless air interface standard. 1x more specifically refers to 1 times Radio Transmission Technology and indicates the same radio frequency (RF) bandwidth as used in IS-95. 1xRTT adds 64 additional traffic channels to the forward link. EV-DO refers to Evolution-Data Optimized. EV-DO is a telecommunications standard for the wireless transmission of data through radio signals.

Figure 1:
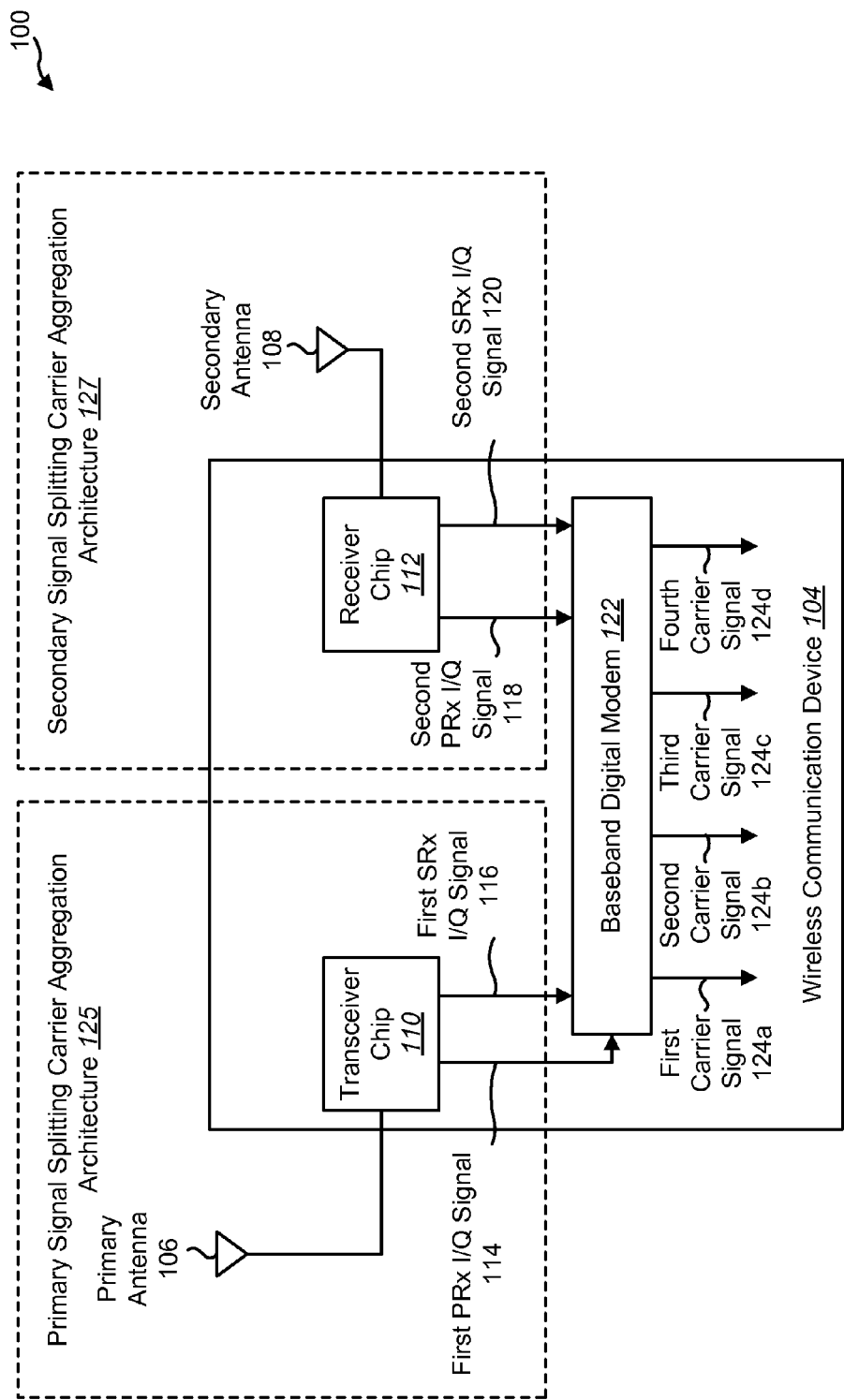
FIG. 1 shows a wireless communication device for use in the present systems and methods.

FIG. 1 shows a wireless communication device 104 for use in the present systems and methods. A wireless communication device 104 may also be referred to as, and may include some or all of the functionality of, a terminal, an access terminal, a user equipment (UE), a subscriber unit, a station, etc. A wireless communication device 104 may be a cellular phone, a personal digital assistant (PDA), a wireless device, a wireless modem, a handheld device, a laptop computer, a PC card, compact flash, an external or internal modem, a wireline phone, etc. A wireless communication device 104 may be mobile or stationary. A wireless communication device 104 may communicate with zero, one or multiple base stations on a downlink and/or an uplink at any given moment. The downlink (or forward link) refers to the communication link from a base station to a wireless communication device 104, and the uplink (or reverse link) refers to the communication link from a wireless communication device 104 to a base station. Uplink and downlink may refer to the communication link or to the carriers used for the communication link.

A wireless communication device 104 may operate in a wireless communication system 100 that includes other wireless devices, such as base stations. A base station is a station that communicates with one or more wireless communication devices 104. A base station may also be referred to as, and may include some or all of the functionality of, an access point, a broadcast transmitter, a Node B, an evolved Node B, etc. Each base station provides communication coverage for a particular geographic area. A base station may provide communication coverage for one or more wireless communication devices 104. The term "cell" can refer to a base station and/or its coverage area, depending on the context in which the term is used.

Communications in a wireless communication system 100 (e.g., a multiple-access system) may be achieved through transmissions over a wireless link. Such a communication link may be established via a single-input and single-output (SISO) or a multiple-input and multiple-output (MIMO) system. A multiple-input and multiple-output (MIMO) system includes transmitter(s) and receiver(s) equipped, respectively, with multiple (NT) transmit antennas and multiple (NR) receive antennas for data transmission. SISO systems are particular instances of a multiple-input and multiple-output (MIMO) system. The multiple-input and multiple-output (MIMO) system can provide improved performance (e.g., higher throughput, greater capacity or improved reliability) if the additional dimensionalities created by the multiple transmit and receive antennas are utilized.

The wireless communication system 100 may utilize both single-input and multiple-output (SIMO) and multiple-input and multiple-output (MIMO). The wireless communication system 100 may be a multiple-access system capable of supporting communication with multiple wireless communication devices 104 by sharing the available system resources (e.g., bandwidth and transmit power). Examples of such multiple-access systems include code division multiple access (CDMA) systems, wideband code division multiple access (W-CDMA) systems, time division multiple access (TDMA) systems, frequency division multiple access (FDMA) systems, orthogonal frequency division multiple access (OFDMA) systems, single-carrier frequency division multiple access (SC-FDMA) systems, $3^{rd}$ Generation Partnership Project (3GPP) Long Term Evolution (LTE) systems and spatial division multiple access (SDMA) systems.

The wireless communication device 104 may utilize signal splitting. In signal splitting, signals are directed to a specific path. One form of signal splitting is current steering. In one configuration of intra-band carrier aggregation, signal splitting refers to taking a signal from the output of a first stage amplifier (such as a transconductance stage (Gm)), splitting the signal and piping the signal into two separate primary and secondary stage amplifiers (such as cascode stages (Cas)) and subsequent primary and diversity mixers for carrier aggregation. In another configuration of intra-band carrier aggregation, signal splitting refers to taking a signal from the output of a second stage amplifier (such as a cascode stage (Cas)), splitting the signal and piping the signal into two separate primary and diversity mixers for carrier aggregation.

In one configuration of inter-band carrier aggregation, signal splitting refers to taking a signal output from a first stage amplifier (such as a transconductance stage (Gm)) and steering (or diverting or pumping) the signal into a second stage amplifier (such as a cascode stage (Cas)) and subsequent mixer in the diversity path to be downconverted using a diversity local oscillator (LO). In another configuration of inter-band carrier aggregation, signal splitting refers to taking a signal output from a second stage amplifier (such as a cascode stage (Cas)) and steering (or diverting or pumping) the signal into a subsequent mixer in the diversity path to be downconverted using a diversity local oscillator (LO). The signal steering herein is current steering.

However, voltage steering may also be used. In one configuration of voltage steering for inter-band carrier aggregation, a signal output from a first stage amplifier (such as a transconductance stage (Gm)) may be diverted to a second stage amplifier (such as a cascode stage (Cas)) and subsequent mixer in the diversity path to be downconverted using a diversity local oscillator (LO). In another configuration of voltage steering for inter-band carrier aggregation, a signal output from a second stage amplifier (such as a cascode stage (Cas)) may be diverted to a subsequent mixer in the diversity path to be downconverted using a diversity local oscillator (LO).

The wireless communication device 104 may include a primary antenna 106 and a secondary antenna 108. The secondary antenna 108 may be referred to as the diversity antenna. A transceiver chip 110 may be coupled to the primary antenna 106. The transceiver chip 110 may include a transmitter, a primary receiver (PRx) and a secondary receiver (SRx). The transceiver chip 110 may output a first PRx inphase/quadrature (I/Q) signal 114 and a first SRx inphase/quadrature (I/Q) signal 116 to a baseband digital modem 122. The configuration of the primary antenna 106 and the transceiver chip 110 may be referred to as a primary signal splitting carrier aggregation architecture 125. The primary signal splitting carrier aggregation architecture 125 is discussed in additional detail below in relation to FIG. 2.

In general, the primary signal splitting carrier aggregation architecture 125 may split the received signal into the first PRx inphase/quadrature (I/Q) signal 114 using a low noise amplifier (LNA) in the primary receiver (PRx) and the first SRx inphase/quadrature (I/Q) signal 116 using a routing between a first low noise amplifier (LNA) in the primary receiver (PRx) and a second low noise amplifier (LNA) in the secondary receiver (SRx) of the transceiver chip 110. The routing may couple the output of a stage in the first low noise amplifier (LNA) to the input of a stage in the second low noise amplifier (LNA). There may be many different ways to split the signals. In one configuration, the stage in the first low noise amplifier (LNA) may be a transconductance stage (Gm) and the stage in the second low noise amplifier (LNA) may be a cascode stage (Cas). In another configuration, the first stage may be a transconductance stage (Gm) and the second stage may be a transformer used to split the signal.

A receiver chip 112 may be coupled to the secondary antenna 108. The receiver chip 112 may include both a primary receiver (PRx) and a secondary receiver (SRx). The receiver chip 112 may output a second PRx inphase/quadrature (I/Q) signal 118 and a second SRx inphase/quadrature (I/Q) signal 120 to the baseband digital modem 122. The configuration of the secondary antenna 108 and the receiver chip 112 may be referred to as a secondary signal splitting carrier aggregation architecture 127. The secondary signal splitting carrier aggregation architecture 127 is discussed in additional detail below in relation to FIG. 3. In one configuration, the transceiver chip 110 may be located proximate to the primary antenna 106 on the wireless communication device 104 and the receiver chip 112 may be located proximate to the secondary antenna 108 on the wireless communication device 104. In other words, the transceiver chip 110 and the receiver chip 112 may not be proximate to each other.

In general, the secondary signal splitting carrier aggregation architecture 127 may split the received signal into the second PRx inphase/quadrature (I/Q) signal 118 using a low noise amplifier (LNA) in the primary receiver (PRx) and the second SRx inphase/quadrature (I/Q) signal 120 using a routing between a first low noise amplifier (LNA) in the primary receiver (PRx) and a second low noise amplifier (LNA) in the secondary receiver (SRx) of the receiver chip 112. There may be many different ways to split the signals. In one configuration, the stage in the first low noise amplifier (LNA) may be a transconductance stage (Gm) and the stage in the second low noise amplifier (LNA) may be a cascode stage (Cas). In another configuration, the first stage may be a transconductance stage (Gm) and the second stage may be a transformer used to split the signal.

The wireless communication device 104 may use a signal splitting carrier aggregation architecture that reuses the diversity/simultaneous hybrid dual receiver (SHDR) path. Carrier aggregation may be achieved by coupling the primary receiver (PRx) signal in a chip (i.e., in the transceiver chip 110 and the receiver chip 112) to the diversity receiver (DRx) path. One advantage of the signal splitting carrier aggregation architecture of the present systems and methods is the ability to operate using only two antennas. Because a wireless communication device 104 with less antennas is cheaper, less bulky and less complicated, a wireless communication device 104 with the minimum number of antennas may be advantageous.

The wireless communication device 104 of the present systems and methods does not require the use of a power splitter. By removing a power splitter from the wireless communication device 104, the wireless communication device 104 may consume less power. Furthermore, the lack of a power splitter may reduce the cost of the wireless communication device 104 and free up die area. The signal splitting carrier aggregation architecture of the present systems and methods may also not require the use of external low noise amplifiers (LNAs). External low noise amplifiers (LNAs) may consume large amounts of power and increase the cost of a wireless communication device 104. Another benefit of the signal splitting carrier aggregation architecture of the present systems and methods is the ability to operate without die-to-die signal routing. Removing die-to-die signal routing may reduce both the complexity and cost of the wireless communication device 104. Removing die-to-die signaling may also allow for optimal placement of antennas on the wireless communication device 104. The signal splitting carrier aggregation architecture may have four synthesizers running.

The baseband digital modem 122 may perform processing on the first PRx inphase/quadrature (I/Q) signal 114, the second PRx inphase/quadrature (I/Q) signal 118, the first SRx inphase/quadrature (I/Q) signal 116 and the second SRx inphase/quadrature (I/Q) signal 120. For example, the baseband digital modem 122 may convert the signals to the digital domain using analog-to-digital converters (ADCs) and perform digital processing on the signals using digital signal processors (DSPs). The baseband digital modem 122 may then output a first carrier signal 124a, a second carrier signal 124b, a third carrier signal 124c and a fourth carrier signal 124d. A carrier signal may refer to the carrier that the signal used.

In one configuration, the first carrier signal 124a and the second carrier signal 124b may be located in the low band while the third carrier signal 124c and the fourth carrier signal 124d are located within the midband. This may be referred to as inter-band operation or Dual-Band 4-Carrier according to Rel-10. Inter-band operation is discussed in additional detail below in relation to FIG. 5 and FIG. 6 below. In another configuration, the first carrier signal 124a, second carrier signal 124b, third carrier signal 124c and fourth carrier signal 124d may all be located within a single band, such as the low band. This may be referred to as intra-band operation or Single-Band 4-Carrier in Release-10. Intra-band operation is discussed in additional detail below in relation to FIG. 7 and FIG. 8 below.

In another configuration, the wireless communication device 104 may operate in simultaneous hybrid dual receiver (SHDR) mode. In simultaneous hybrid dual receiver (SHDR) mode, only the transceiver chip 110 may be used (i.e., the receiver chip 112 may be disabled). The configuration of the transceiver chip 110 operating in inter-band simultaneous hybrid dual receiver (SHDR) mode is discussed below in relation to FIG. 9. The configuration of the transceiver chip 110 operating in intra-band simultaneous hybrid dual receiver (SHDR) mode is discussed below in relation to FIG. 10.

In yet another configuration, the wireless communication device 104 may operate in diversity mode. In diversity mode, both the transceiver chip 110 and the receiver chip 112 are tuned to receive the same carrier frequency. The configuration of the transceiver chip 110 operating in diversity mode is discussed below in relation to FIG. 11. The configuration of the receiver chip 112 operating in diversity mode is discussed below in relation to FIG. 12.

Figure 2:
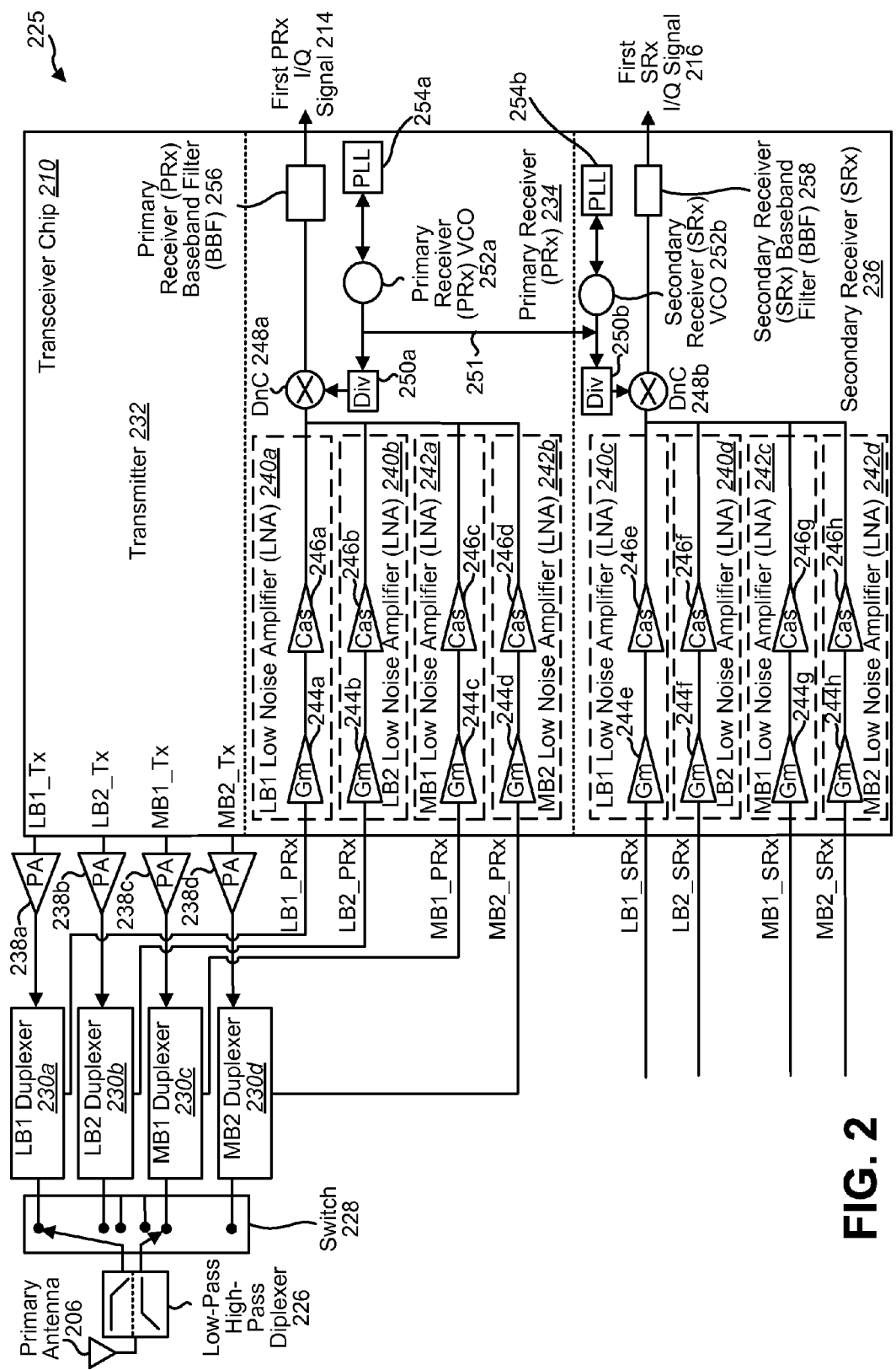
FIG. 2 is a block diagram illustrating a primary signal splitting carrier aggregation architecture.

FIG. 2 is a block diagram illustrating a primary signal splitting carrier aggregation architecture 225. The primary signal splitting carrier aggregation architecture 225 of FIG. 2 may be one configuration of the primary signal splitting carrier aggregation architecture 125 of FIG. 1. The primary signal splitting carrier aggregation architecture 125 may include a primary antenna 206, a low-pass high-pass diplexer 226, a switch 228, four duplexers 230a-d and a transceiver chip 210. The primary antenna 206 may be coupled to the low-pass high-pass diplexer 226. The low-pass high-pass diplexer 226 may bundle low band frequencies into one signal and high band (or midband) frequencies into another signal, thus allowing the primary antenna 206 to pass both low band and midband signals to the transceiver chip 210.

The low-pass high-pass diplexer 226 may be coupled to the switch 228. The switch 228 may have two inputs (the signal that includes the bundled low band frequencies and the signal that includes the bundled high band frequencies) and multiple outputs. In one configuration, the switch 228 may have six possible outputs to the four duplexers 230 (representing the six possible configurations of duplexer 230 pairs). The four duplexers 230 may include a first low band (LB1) duplexer 230a, a second low band (LB2) duplexer 230b, a first midband (MB1) duplexer 230c and a second midband (MB2) duplexer 230d.

As discussed above, the transceiver chip 210 may include a transmitter 232, a primary receiver (PRx) 234 and a secondary receiver (SRx) 236. The transmitter 232 may include two low band outputs (LB1_Tx and LB2_Tx) and two midband outputs (MB1_Tx and MB2_Tx). The first low band output (LB1_Tx) may be coupled to the first low band (LB1) duplexer 230a via a power amplifier (PA) 238a. The second low band output (LB2_Tx) may be coupled to the second low band (LB2) duplexer 230b via a power amplifier 238b. The first midband output (MB1_Tx) may be coupled to the first midband (MB1) duplexer 230c via a power amplifier 238c. The second midband output (MB2_Tx) may be coupled to the second midband (MB2) duplexer 230d via a power amplifier 238d.

The primary receiver (PRx) 234 may include a first low band input (LB1_PRx) coupled to the first low band (LB1) duplexer 230a, a second low band input (LB2_PRx) coupled to the second low band (LB2) duplexer 230b, a first midband input (MB1_PRx) coupled to the first midband (MB1) duplexer 230c and a second midband input (MB2_PRx) coupled to the second midband (MB2) duplexer 230d. The first low band input (LB1_PRx) may be coupled to a first low band (LB1) low noise amplifier (LNA) 240a that includes a transconductance stage (Gm) 244a and a cascode stage (Cas) 246a. The second low band input (LB2_PRx) may be coupled to a second low band (LB2) low noise amplifier (LNA) 240b that includes a transconductance stage (Gm) 244b and a cascode stage (Cas) 246b. The first midband input (MB1_PRx) may be coupled to a first midband (MB1) low noise amplifier (LNA) 242a that includes a transconductance stage (Gm) 244c and a cascode stage (Cas) 246c. The second midband input (MB2_PRx) may be coupled to a second midband (MB2) low noise amplifier (LNA) 242a that includes a transconductance stage (Gm) 244d and a cascode stage (Cas) 246d.

The primary receiver (PRx) 234 may also include a downconverter (DnC) 248a. The downconverter (DnC) 248a may be coupled to the output of the first low band (LB1) low noise amplifier (LNA) 240a, the output of the second low band (LB2) low noise amplifier (LNA) 240b, the output of the first midband (MB1) low noise amplifier (LNA) 242a and the output of the second midband (MB2) low noise amplifier (LNA) 242b.

The primary receiver (PRx) 234 may include a phase locked loop (PLL) 254a, a voltage controlled oscillator (VCO) 252a and a Div stage 250a that are used to generate the downconverting frequency for the downconverter (DnC) 248a. The output of the downconverter (DnC) 248a may be coupled to a primary receiver (PRx) baseband filter (BBF) 256. The primary receiver (PRx) baseband filter (BBF) 256 may then output the first PRx inphase/quadrature (I/Q) signal 214.

The secondary receiver (SRx) 236 may include a first low band input (LB1_SRx), a second low band input (LB2_SRx), a first midband input (MB1_SRx) and a second midband input (MB2_SRx) that are disabled. The first low band input (LB1_SRx) may be coupled to a first low band (LB1) low noise amplifier (LNA) 240c that includes a transconductance stage (Gm) 244e and a cascode stage (Cas) 246e. The second low band input (LB2_SRx) may be coupled to a second low band (LB2) low noise amplifier (LNA) 240d that includes a transconductance stage (Gm) 244f and a cascode stage (Cas) 246f. The first midband input (MB1_SRx) may be coupled to a first midband (MB1) low noise amplifier (LNA) 242c that includes a transconductance stage (Gm) 244g and a cascode stage (Cas) 246g. The second midband input (MB2_SRx) may be coupled to a second midband (MB2) low noise amplifier (LNA) 242d that includes a transconductance stage (Gm) 244h and a cascode stage (Cas) 246h. In one configuration, the first low band (LB1) low noise amplifier (LNA) 240c, the second low band (LB2) low noise amplifier (LNA) 240d, the first midband (MB1) low noise amplifier (LNA) 242c and the second midband (MB2) low noise amplifier (LNA) 242d of the secondary receiver (SRx) 236 may each be disabled. However, portions within some of the low noise amplifiers (LNAs) 240c-d, 242c-d may still be used (e.g., the transconductance stage (Gm) 244 and the Cascode stage (Cas) 246) to allow the reuse of the diversity/simultaneous hybrid dual receiver (SHDR) receiver path (i.e., for the primary signal splitting carrier aggregation architecture 225).

The secondary receiver (SRx) 236 may also include a downconverter (DnC) 248b. The downconverter (DnC) 248b may be coupled to the output of the first low band (LB1) low noise amplifier (LNA) 240c, the output of the second low band (LB2) low noise amplifier (LNA) 240d, the output of the first midband (MB1) low noise amplifier (LNA) 242c and the output of the second midband (MB2) low noise amplifier (LNA) 242d. The secondary receiver (SRx) 236 may further include a phase locked loop (PLL) 254b, a voltage controlled oscillator (VCO) 252b and a Div stage 250b that are used to generate the downconverting frequency for the downconverter (DnC) 248b.

The output of the downconverter (DnC) 248b may be coupled to a secondary receiver (SRx) baseband filter (BBF) 258. The secondary receiver (SRx) baseband filter (BBF) 258 may then output the first SRx inphase/quadrature (I/Q) signal 216. In one configuration, the secondary receiver (SRx) 236 may not include the secondary receiver (SRx) voltage controlled oscillator (VCO) 252b and the phase locked loop (PLL) 254b or the secondary receiver (SRx) voltage controlled oscillator (VCO) 252b and the phase locked loop (PLL) 254b may be disabled. Instead, the transceiver chip 210 may pump the same voltage controlled oscillator (VCO) signal 251 used in the primary receiver (PRx) 234 to the secondary receiver (SRx) 236.

Figure 3:
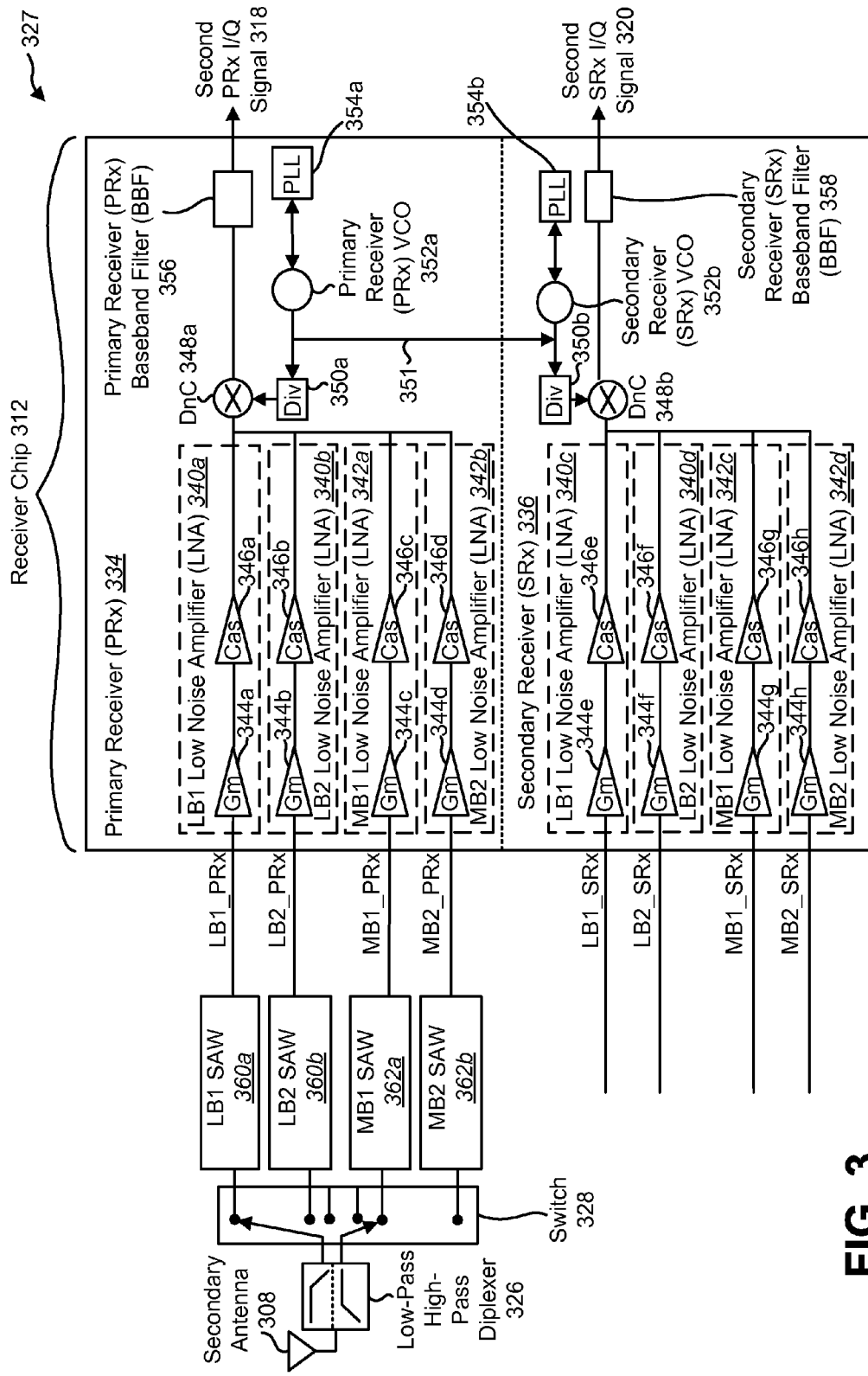
FIG. 3 is a block diagram illustrating a secondary signal splitting carrier aggregation architecture.

FIG. 3 is a block diagram illustrating a secondary signal splitting carrier aggregation architecture 327. The secondary signal splitting carrier aggregation architecture 327 of FIG. 3 may be one configuration of the secondary signal splitting carrier aggregation architecture 127 of FIG. 1. The secondary signal splitting carrier aggregation architecture 327 may include a secondary antenna 308, a low-pass high-pass diplexer 326, a switch 328, four surface acoustic wave (SAW) filters 360a-b, 362a-b and a receiver chip 312. The secondary antenna 308 may be coupled to the low-pass high-pass diplexer 326. The low-pass high-pass diplexer 326 may bundle low band frequencies into one signal and high band (or mid band) frequencies into another signal, thus allowing the secondary antenna 308 to pass both low band and mid band signals to the receiver chip 312.

The low-pass high-pass diplexer 326 may be coupled to the switch 328. The switch 328 may have two inputs (the signal that includes the bundled low band frequencies and the signal that includes the bundled high band frequencies) and multiple outputs. In one configuration, the switch 328 may have six possible outputs to the four surface acoustic wave (SAW) filters 360, 362 (representing the four possible configurations of surface acoustic wave (SAW) filter 360, 362 pairs). The four surface acoustic wave (SAW) filters 360, 362 may include a first low band (LB1) surface acoustic wave (SAW) filter 360a, a second low band (LB2) surface acoustic wave (SAW) filter 360b, a first midband (MB1) surface acoustic wave (SAW) filter 362a and a second midband (MB2) surface acoustic wave (SAW) filter 362b.

The receiver chip 312 may include a primary receiver (PRx) 334 and a secondary receiver (SRx) 336. The primary receiver (PRx) 334 may include a first low band input (LB1_PRx) coupled to the first low band (LB1) surface acoustic wave (SAW) filter 360a, a second low band input (LB2_PRx) coupled to the second low band (LB2) surface acoustic wave (SAW) filter 360b, a first midband input (MB1_PRx) coupled to the first midband (MB1) surface acoustic wave (SAW) filter 362a and a second midband input (MB2_PRx) coupled to the second midband (MB2) surface acoustic wave (SAW) filter 362b. The first low band input (LB1_PRx) may be coupled to a first low band (LB1) low noise amplifier (LNA) 340a that includes a transconductance stage (Gm) 344a and a cascode stage (Cas) 346a. The second low band input (LB2_PRx) may be coupled to a second low band (LB2) low noise amplifier (LNA) 340b that includes a transconductance stage (Gm) 344b and a cascode stage (Cas) 346b. The first midband input (MB1_PRx) may be coupled to a first midband (MB1) low noise amplifier (LNA) 342a that includes a transconductance stage (Gm) 344c and a cascode stage (Cas) 346c. The second midband input (MB2_PRx) may be coupled to a second midband (MB2) low noise amplifier (LNA) 342b that includes a transconductance stage (Gm) 344d and a cascode stage (Cas) 346d.

The primary receiver (PRx) 334 may also include a downconverter (DnC) 348a. The downconverter (DnC) 348a may be coupled to the output of the first low band (LB1) low noise amplifier (LNA) 340a, the output of the second low band (LB2) low noise amplifier (LNA) 340b, the output of the first midband (MB1) low noise amplifier (LNA) 342a and the output of the second midband (MB2) low noise amplifier (LNA) 342b.

The primary receiver (PRx) 334 may include a phase locked loop (PLL) 354a, a voltage controlled oscillator (VCO) 352a and a Div stage 350a that are used to generate the downconverting frequency for the downconverter (DnC) 348a. The output of the downconverter (DnC) 348a may be coupled to a primary receiver (PRx) baseband filter (BBF) 356. The primary receiver (PRx) baseband filter (BBF) 356 may then output the second PRx inphase/quadrature (I/Q) signal 318.

The secondary receiver (SRx) 336 may include a first low band input (LB1_SRx), a second low band input (LB2_SRx), a first midband input (MB1_SRx) and a second midband input (MB2_SRx) that are disabled. The first low band input (LB1_SRx) may be coupled to a first low band (LB1) low noise amplifier (LNA) 340c that includes a transconductance stage (Gm) 344e and a cascode stage (Cas) 346e. The second low band input (LB2_SRx) may be coupled to a second low band (LB2) low noise amplifier (LNA) 340d that includes a transconductance stage (Gm) 344f and a cascode stage (Cas) 346f. The first midband input (MB1_SRx) may be coupled to a first midband (MB1) low noise amplifier (LNA) 342c that includes a transconductance stage (Gm) 344g and a cascode stage (Cas) 346g. The second midband input (MB2_SRx) may be coupled to a second midband (MB2) low noise amplifier (LNA) 342d that includes a transconductance stage (Gm) 344h and a cascode stage (Cas) 346h. In one configuration, the first low band (LB1) low noise amplifier (LNA) 340c, the second low band (LB2) low noise amplifier (LNA) 340d, the first midband (MB1) low noise amplifier (LNA) 342c and the second midband (MB2) low noise amplifier (LNA) 342d may each be disabled. However, portions within some of the low noise amplifiers (LNAs) 340c-d, 342c-d may still be used (e.g., the transconductance stage (Gm) 344 and the cascode stage (Cas) 346) to allow the reuse of the diversity/simultaneous hybrid dual receiver (SHDR) receiver path (i.e., for the secondary signal splitting carrier aggregation architecture 327).

The secondary receiver (SRx) 336 may also include a downconverter (DnC) 348b. The downconverter (DnC) 348b may be coupled to the output of the first low band (LB1) low noise amplifier (LNA) 340c, the output of the second low band (LB2) low noise amplifier (LNA) 340d, the output of the first midband (MB1) low noise amplifier (LNA) 342c and the output of the second midband (MB2) low noise amplifier (LNA) 342d. The secondary receiver (SRx) 336 may further include a phase locked loop (PLL) 354b, a voltage controlled oscillator (VCO) 352b and a Div stage 350b that are used to generate the downconverting frequency for the downconverter (DnC) 348b. The output of the downconverter (DnC) 348b may be coupled to a secondary receiver (SRx) baseband filter (BBF) 358. The secondary receiver (SRx) baseband filter (BBF) 358 may then output the second SRx inphase/quadrature (I/Q) signal 320. In one configuration, the secondary receiver (SRx) 336 may not include the secondary receiver (SRx) voltage controlled oscillator (VCO) 352b and the phase locked loop (PLL) 354b or the secondary receiver (SRx) voltage controlled oscillator (VCO) 352b and the phase locked loop (PLL) 354b may be disabled. Instead, the receiver chip 312 may pump the same voltage controlled oscillator (VCO) signal 351 used in the primary receiver (PRx) 334 to the secondary receiver (SRx) 336.

Figure 4:
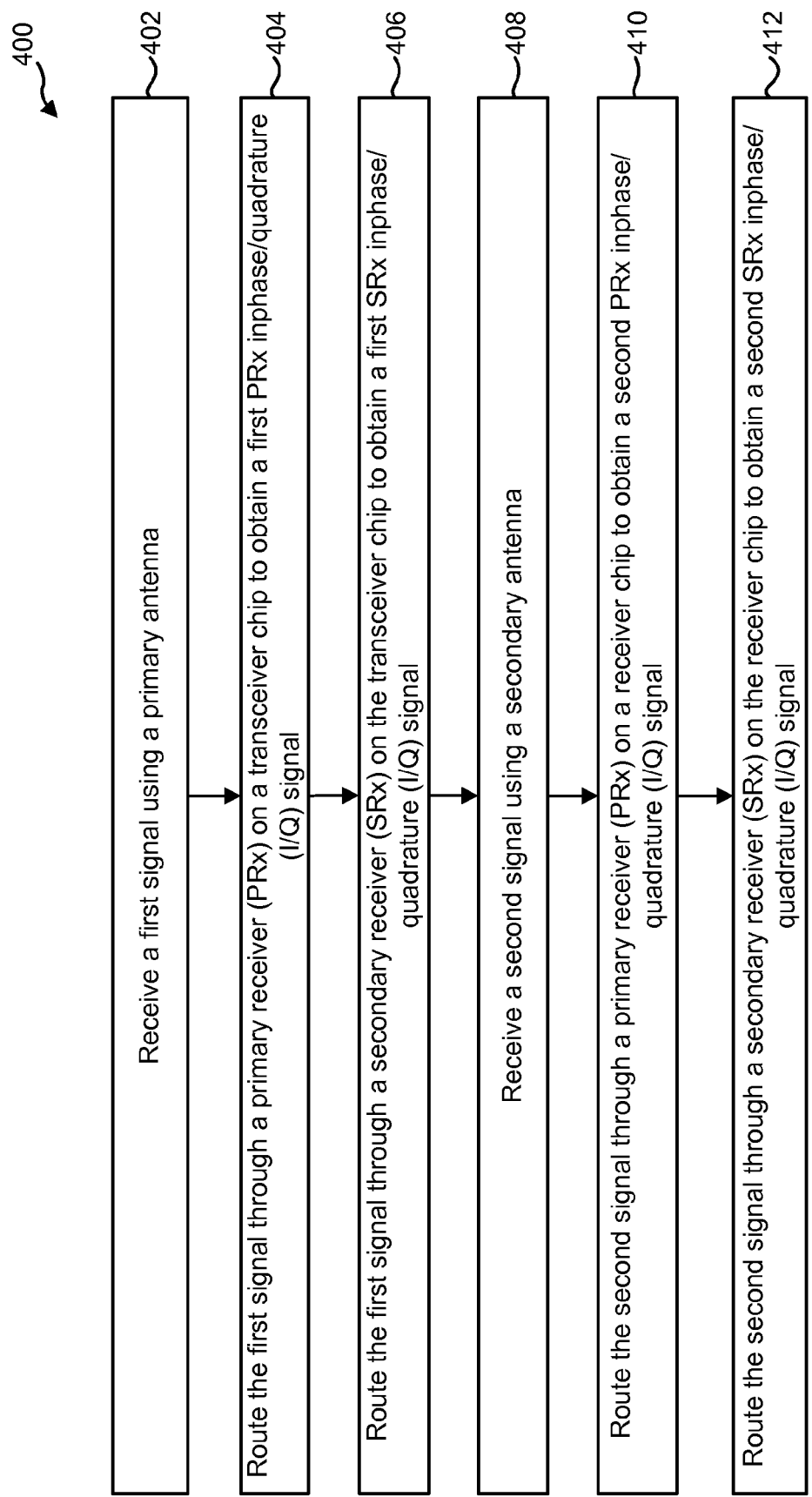
FIG. 4 is a flow diagram of a method for receiving signals using a signal splitting carrier aggregation architecture.

FIG. 4 is a flow diagram of a method 400 for receiving signals using a signal splitting carrier aggregation architecture. The method 400 may be performed by a wireless communication device 104. The wireless communication device 104 may receive 402 a first signal using a primary antenna 106. The wireless communication device 104 may route 404 the first signal through a primary receiver (PRx) 234 on a transceiver chip 110 to obtain a first PRx inphase/quadrature (I/Q) signal 114. The wireless communication device 104 may also route 406 the first signal through a secondary receiver (SRx) 236 on the transceiver chip 110 to obtain a first SRx inphase/quadrature (I/Q) signal 116.

The wireless communication device 104 may receive 408 a second signal using a secondary antenna 108. The wireless communication device 104 may route 410 the second signal through a primary receiver (PRx) 334 on a receiver chip 112 to obtain a second PRx inphase/quadrature (I/Q) signal 118. The wireless communication device 104 may also route 412 the second signal through a secondary receiver (SRx) 336 on the receiver chip 112 to obtain a second SRx inphase/quadrature (I/Q) signal 120.

Figure 5:
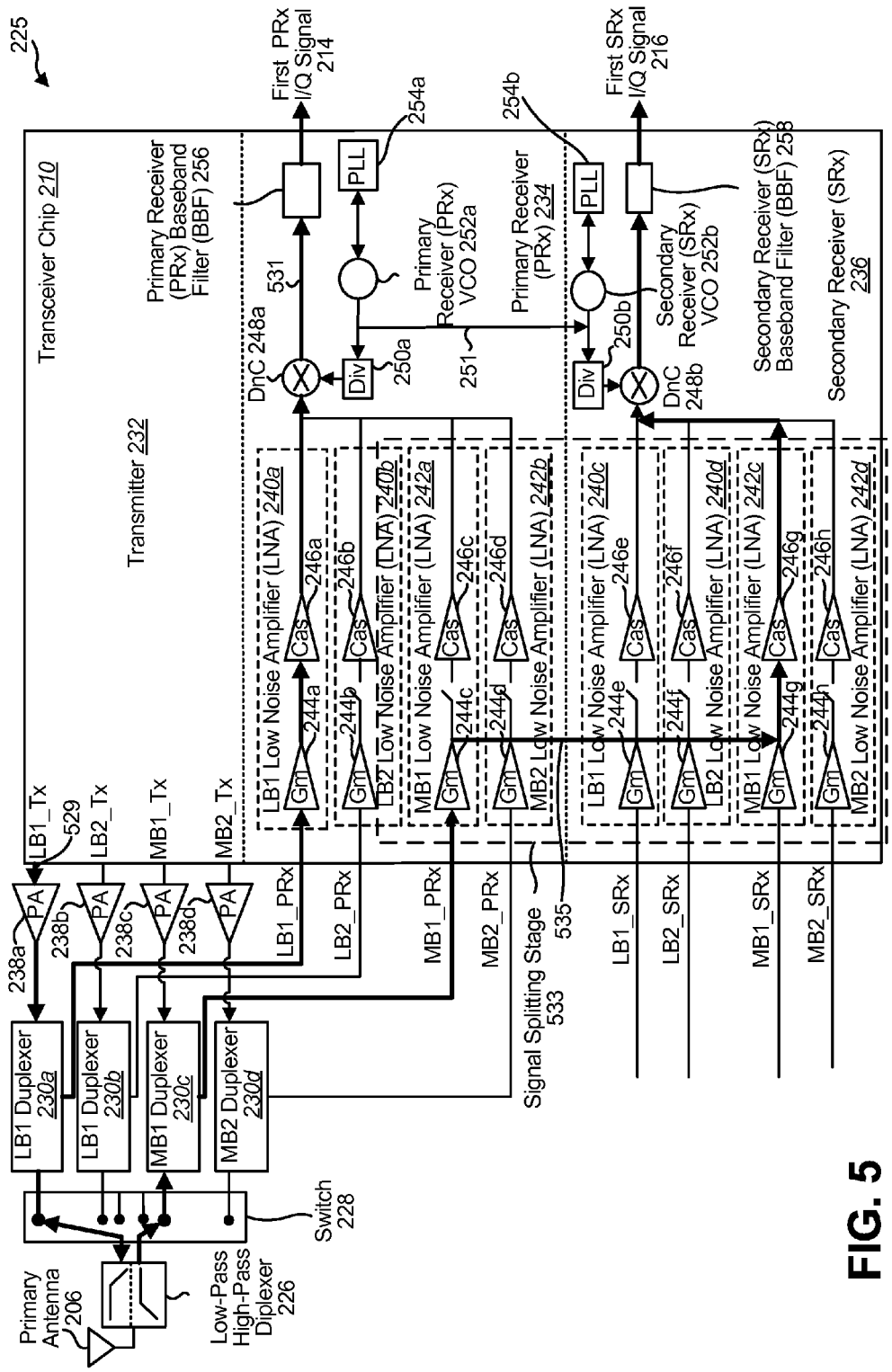
FIG. 5 is a block diagram illustrating a primary signal splitting carrier aggregation architecture in inter-band operation.

FIG. 5 is a block diagram illustrating a primary signal splitting carrier aggregation architecture 225 in inter-band operation. The primary signal splitting carrier aggregation architecture 225 of FIG. 5 may be the primary signal splitting carrier aggregation architecture 225 of FIG. 2. The primary antenna 206 may be used to receive a dual-band 4-carrier signal (i.e., four carriers over two separate bands). The routing 531 from the primary antenna 206 through the primary receiver (PRx) 234 to obtain the first PRx inphase/quadrature (I/Q) signal 214 is shown. The first PRx inphase/quadrature (I/Q) signal 214 may include two carriers from a first band (e.g., the low band) for this configuration.

The routing 535 from the primary antenna 206 through the secondary receiver (SRx) 236 to obtain the first SRx inphase/quadrature (I/Q) signal 216 is also shown. The first SRx inphase/quadrature (I/Q) signal 216 may include two carriers from a second band (e.g., the midband) for this configuration. The routing 535 from the primary antenna 206 through the secondary receiver (SRx) 236 to obtain the first SRx inphase/quadrature (I/Q) signal 216 may pass through a signal splitting stage 533. The signal splitting stage 533 may allow the primary signal splitting carrier aggregation architecture 225 to reuse the diversity/simultaneous hybrid dual receiver (SHDR) receiver path. The signal splitting stage 533 may take the signal from a low noise amplifier (LNA) (e.g., the first midband (MB1) low noise amplifier (LNA) 242a in the primary receiver (PRx) 234 after the transconductance stage (Gm) 244c and route the signal to a stage (e.g., the cascode stage (Cas) 246g) of a low noise amplifier (LNA) (e.g., the first midband (MB1) low noise amplifier (LNA) 242c) in the secondary receiver (SRx) 236. In another configuration (not shown), the signal splitting stage 533 may take the signal input to the first midband (MB1) low noise amplifier (LNA) 242a in the primary receiver (PRx) 234 and route the signal to the transconductance stage (Gm) 244g of the first midband (MB1) low noise amplifier (LNA) 242c in the secondary receiver (SRx) 236. The signal splitting stage 533 is discussed in additional detail below in relation to FIG. 13 and FIG. 14. The routing 529 from the transmitter 232 to the primary antenna 206 is also shown.

Figure 6:
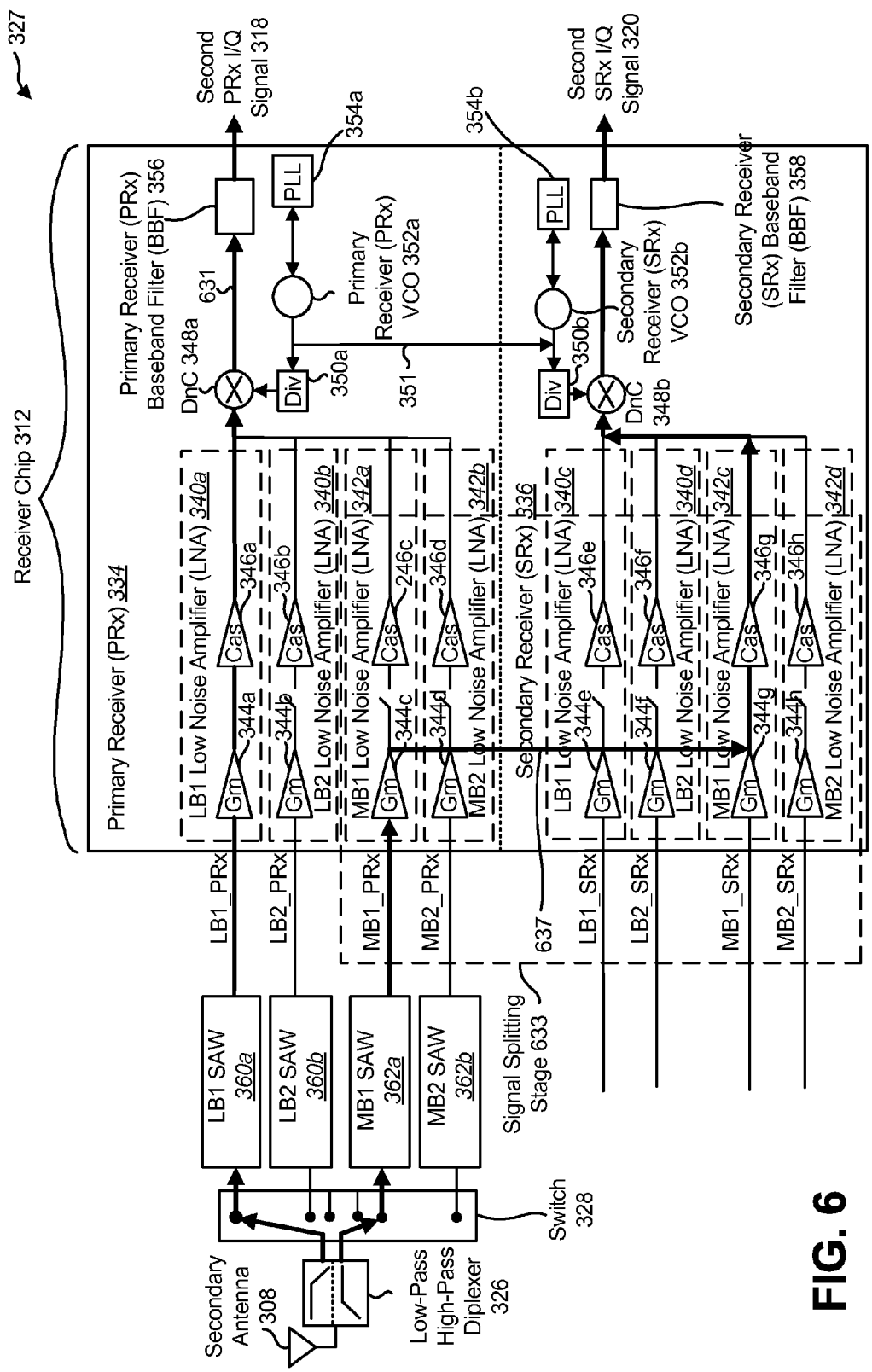
FIG. 6 is a block diagram illustrating a secondary signal splitting carrier aggregation architecture in inter-band operation.

FIG. 6 is a block diagram illustrating a secondary signal splitting carrier aggregation architecture 327 in inter-band operation. The secondary signal splitting carrier aggregation architecture 327 of FIG. 6 may be the secondary signal splitting carrier aggregation architecture 327 of FIG. 3. The secondary antenna 308 may be used to receive a dual-band 4-carrier signal. The routing 631 from the secondary antenna 308 through the primary receiver (PRx) 334 to obtain the second PRx inphase/quadrature (I/Q) signal 318 is shown. The second PRx inphase/quadrature (I/Q) signal 318 may include two carriers from the low band for this configuration.

The routing 637 from the secondary antenna 308 through the secondary receiver (SRx) 336 to obtain the second SRx inphase/quadrature (I/Q) signal 320 is also shown. The second SRx inphase/quadrature (I/Q) signal 320 may include two carriers from the midband for this configuration. The routing 637 from the secondary antenna 308 through the secondary receiver (SRx) 336 to obtain the second SRx inphase/quadrature (I/Q) signal 320 may pass through a signal splitting stage 633. The signal splitting stage 633 may allow the secondary signal splitting carrier aggregation architecture 327 to reuse the diversity/simultaneous hybrid dual receiver (SHDR) receiver path. The signal splitting stage 633 may take the signal from the first midband (MB1) low noise amplifier (LNA) 342a in the primary receiver (PRx) 334 after the transconductance stage (Gm) 344c and route the signal to the cascode stage (Cas) 346g of the first midband (MB1) low noise amplifier (LNA) 342c in the secondary receiver (SRx) 336. In another configuration (not shown), the signal splitting stage 633 may take the signal input to the first midband (MB1) low noise amplifier (LNA) 342b in the primary receiver (PRx) 334 and route the signal to the transconductance stage (Gm) 344g of the first midband (MB1) low noise amplifier (LNA) 342c in the secondary receiver (SRx) 336. The signal splitting stage 633 is discussed in additional detail below in relation to FIG. 13 and FIG. 14.

Figure 7:
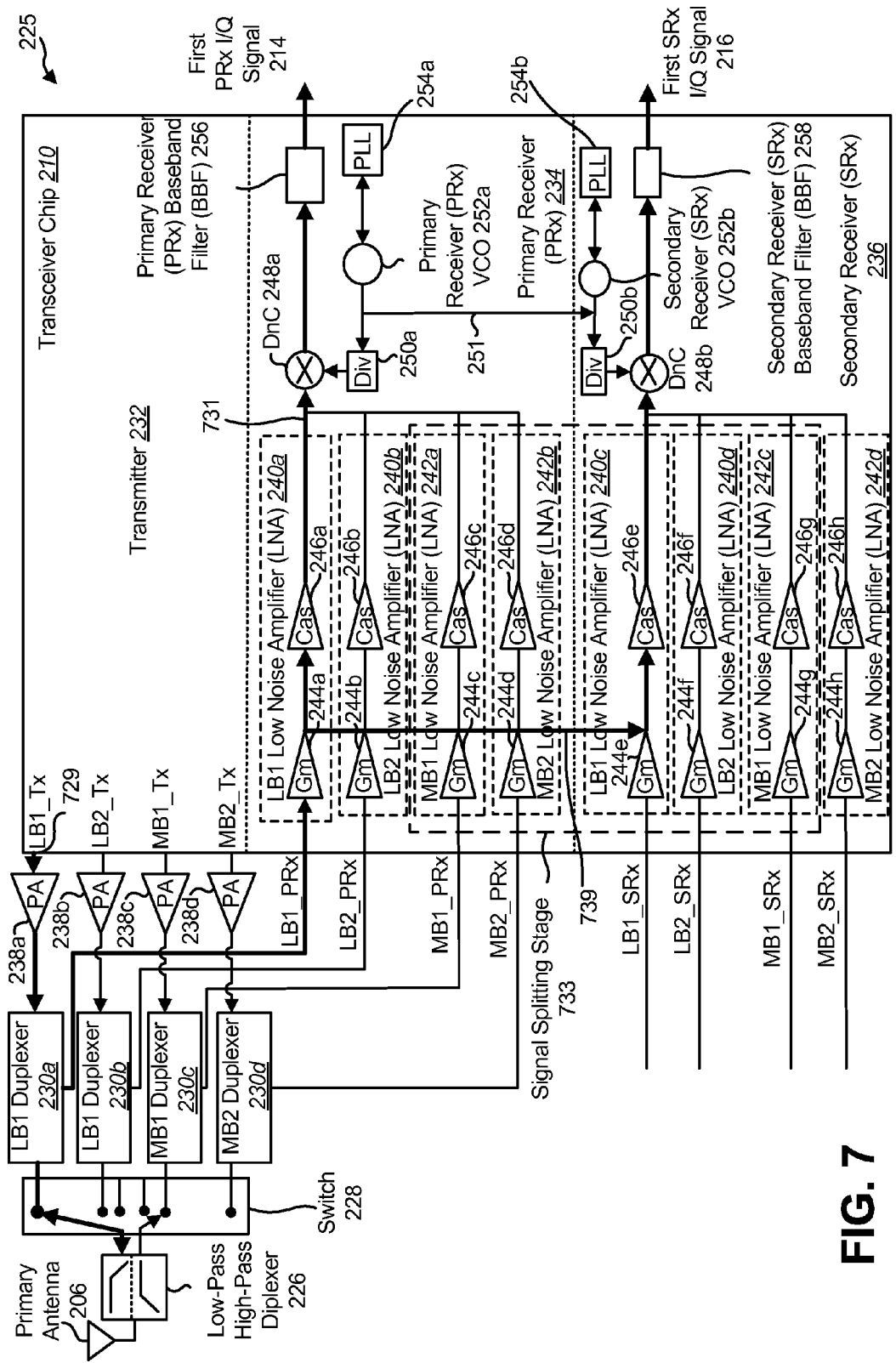
FIG. 7 is a block diagram illustrating a primary signal splitting carrier aggregation architecture in intra-band operation.

FIG. 7 is a block diagram illustrating a primary signal splitting carrier aggregation architecture 225 in intra-band operation. The primary signal splitting carrier aggregation architecture 225 of FIG. 7 may be the primary signal splitting carrier aggregation architecture 225 of FIG. 2. In the primary signal splitting carrier aggregation architecture 225, 6 decibels (dB) of signal loss due to signal splitting may lead to 0.2-0.5 dB NF degradation. The primary antenna 206 may be used to receive a single-band 4-carrier signal. The routing 731 from the primary antenna 206 through the primary receiver (PRx) 234 to obtain the first PRx inphase/quadrature (I/Q) signal 214 is shown. The first PRx inphase/quadrature (I/Q) signal 214 may include two carriers from the low band for this configuration.

The routing 739 from the primary antenna 206 through the secondary receiver (SRx) 236 to obtain the first SRx inphase/quadrature (I/Q) signal 216 is also shown. The first SRx inphase/quadrature (I/Q) signal 216 may include the other two carriers from the low band for this configuration. The routing 739 from the primary antenna 206 through the secondary receiver (SRx) 236 to obtain the first SRx inphase/quadrature (I/Q) signal 216 may pass through a signal splitting stage 733. As discussed above, the signal splitting stage 733 may allow the primary signal splitting carrier aggregation architecture 225 to reuse the diversity/simultaneous hybrid dual receiver (SHDR) receiver path. The signal splitting stage 733 may take the signal from the first low band (LB1) low noise amplifier (LNA) 240a in the primary receiver (PRx) 234 after the transconductance stage (Gm) 244a and route the signal to the cascode stage (Cas) 246e of the first low band (LB1) low noise amplifier (LNA) 240c in the secondary receiver (SRx) 236. In another configuration (not shown), the signal splitting stage 733 may take the signal input to the first low band (LB1) low noise amplifier (LNA) 240a in the primary receiver (PRx) 234 and route the signal to the transconductance stage (Gm) 244e of the first low band (LB1) low noise amplifier (LNA) 240c in the secondary receiver (SRx) 236. The signal splitting stage 733 is discussed in additional detail below in relation to FIG. 13 and FIG. 14. The routing 729 from the transmitter 232 to the primary antenna 206 is also shown.

Figure 8:
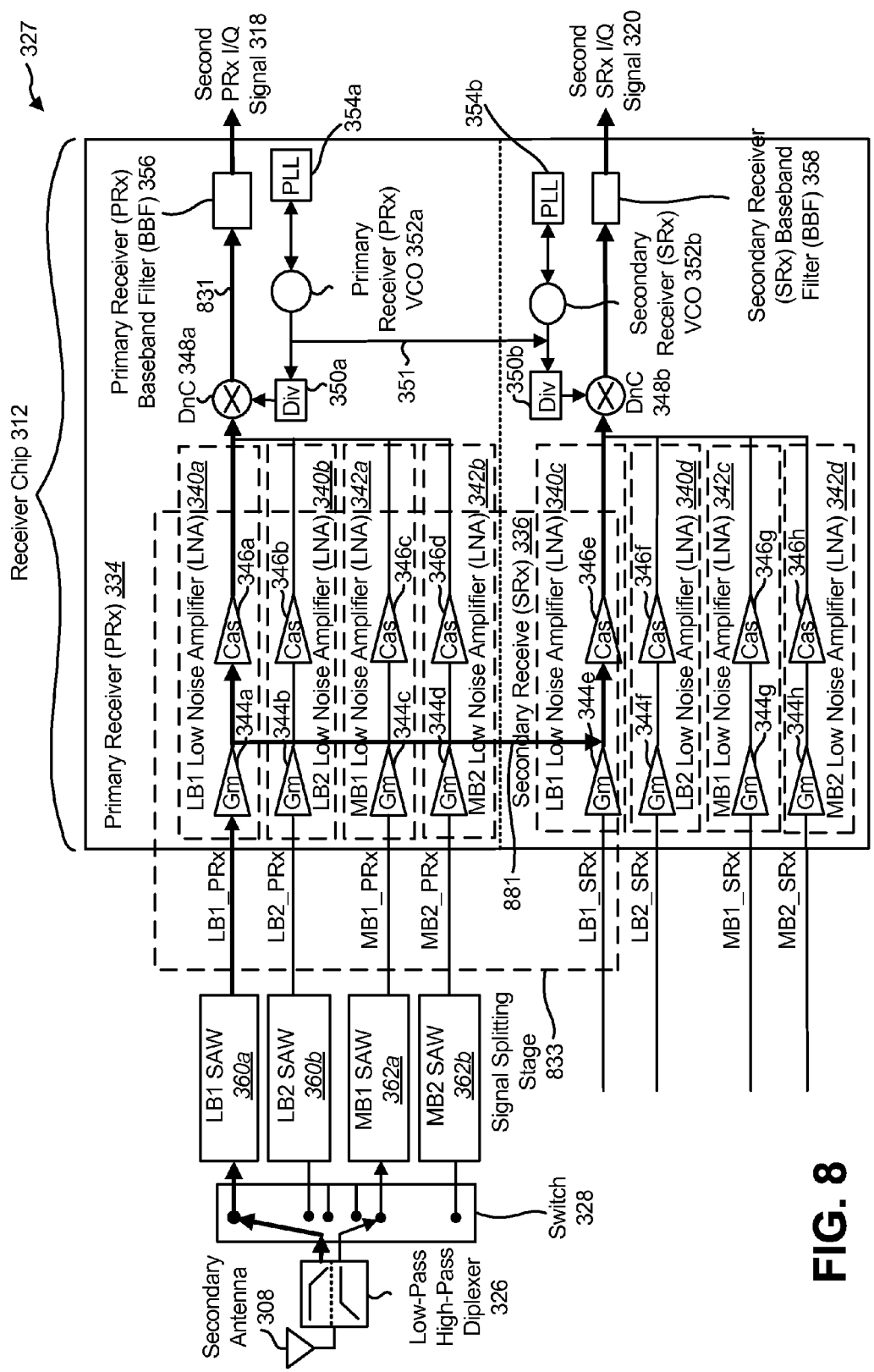
FIG. 8 is a block diagram illustrating a secondary signal splitting carrier aggregation architecture in intra-band operation.

FIG. 8 is a block diagram illustrating a secondary signal splitting carrier aggregation architecture 327 in intra-band operation. The secondary signal splitting carrier aggregation architecture 327 of FIG. 8 may be the secondary signal splitting carrier aggregation architecture 327 of FIG. 3. The secondary antenna 308 may be used to receive a single-band 4-carrier signal. The routing 831 from the secondary antenna 308 through the primary receiver (PRx) 336 to obtain the second PRx inphase/quadrature (I/Q) signal 318 is shown. The second PRx inphase/quadrature (I/Q) signal 318 may include two carriers from the low band for this configuration.

The routing 881 from the secondary antenna 308 through the secondary receiver (SRx) 336 to obtain the second SRx inphase/quadrature (I/Q) signal 320 is also shown. The second SRx inphase/quadrature (I/Q) signal 320 may include the other two carriers from the low band for this configuration. The routing 881 from the secondary antenna 308 through the secondary receiver (SRx) 336 to obtain the second SRx inphase/quadrature (I/Q) signal 320 may pass through a signal splitting stage 833. As discussed above, the signal splitting stage 833 may allow the secondary signal splitting carrier aggregation architecture 327 to reuse the diversity/simultaneous hybrid dual receiver (SHDR) receiver path. In another configuration (not shown), the signal splitting stage 833 may take the signal input to the first low band (LB1) low noise amplifier (LNA) 340a in the primary receiver (PRx) 334 and route the signal to the transconductance stage (Gm) 344e of the first low band (LB1) low noise amplifier (LNA) 340c in the secondary receiver (SRx) 336. The signal splitting stage 833 is discussed in additional detail below in relation to FIG. 13 and FIG. 14.

Figure 9:
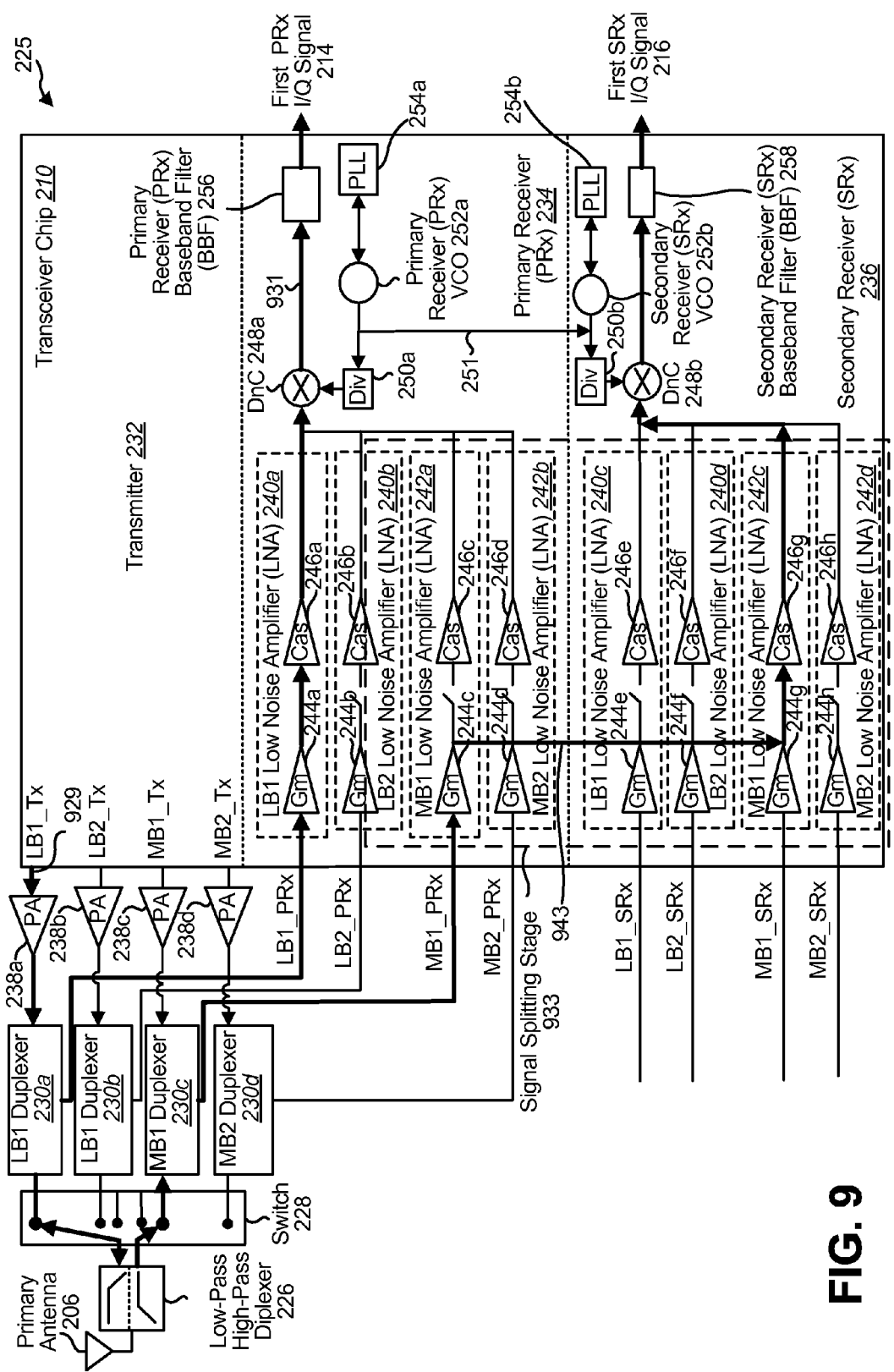
FIG. 9 is a block diagram illustrating a primary signal splitting carrier aggregation architecture operating in inter-band simultaneous hybrid dual receiver (SHDR) mode.

FIG. 9 is a block diagram illustrating a primary signal splitting carrier aggregation architecture 225 operating in inter-band simultaneous hybrid dual receiver (SHDR) mode. The primary signal splitting carrier aggregation architecture 225 of FIG. 9 may be the primary signal splitting carrier aggregation architecture 225 of FIG. 2. The primary antenna 206 may be used to receive signals on a low band carrier and a midband carrier. The routing 931 from the primary antenna 206 through the primary receiver (PRx) 234 to obtain the first PRx inphase/quadrature (I/Q) signal 214 is shown. The first PRx inphase/quadrature (I/Q) signal 214 may include the low band carrier for this configuration.

The routing 943 from the primary antenna 206 through the secondary receiver (SRx) 236 to obtain the first SRx inphase/quadrature (I/Q) signal 216 is also shown. The first SRx inphase/quadrature (I/Q) signal 216 may include the midband carrier for this configuration. The routing 943 from the primary antenna 206 through the secondary receiver (SRx) 236 to obtain the first SRx inphase/quadrature (I/Q) signal 216 may pass through a signal splitting stage 933. The signal splitting stage 933 may take the signal from the first midband (MB1) low noise amplifier (LNA) 242*a* in the primary receiver (PRx) 234 after the transconductance stage (Gm) 244*c* and route the signal to the cascode stage (Cas) 246*g* of the first midband (MB1) low noise amplifier (LNA) 242*c* in the secondary receiver (SRx) 236. In another configuration (not shown), the signal splitting stage 933 may take the signal input to the first midband (MB1) low noise amplifier (LNA) 242*a* in the primary receiver (PRx) 234 and route the signal to the transconductance stage (Gm) 244*g* of the first midband (MB1) low noise amplifier (LNA) 242*c* in the secondary receiver (SRx) 236. The signal splitting stage 933 is discussed in additional detail below in relation to FIG. 13 and FIG. 14. The routing 929 from the transmitter 232 to the primary antenna 206 is also shown.

Figure 10:
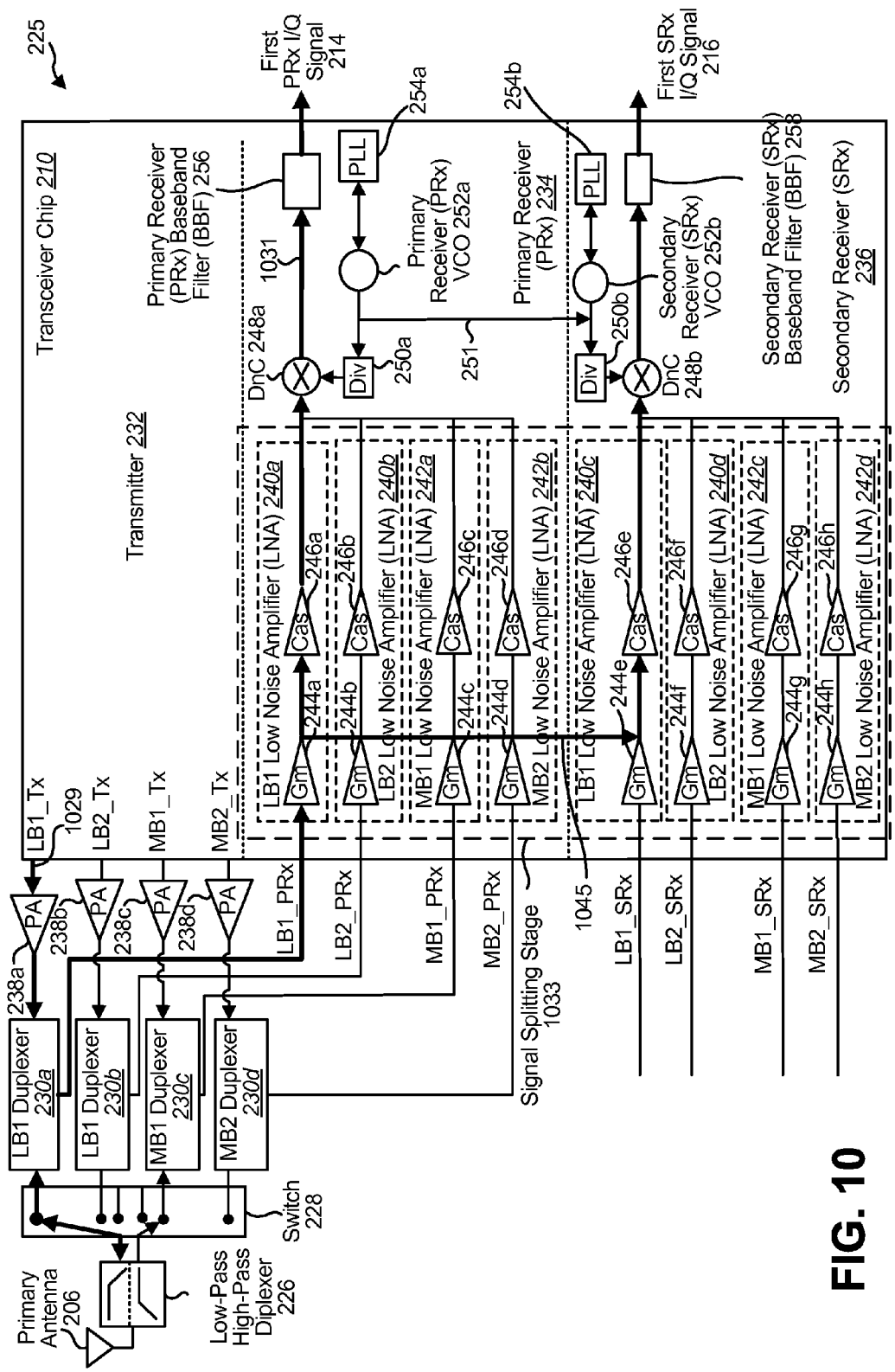
FIG. 10 is a block diagram illustrating a primary signal splitting carrier aggregation architecture operating in intra-band simultaneous hybrid dual receiver (SHDR) mode.

FIG. 10 is a block diagram illustrating a primary signal splitting carrier aggregation architecture 225 operating in intra-band simultaneous hybrid dual receiver (SHDR) mode. The primary signal splitting carrier aggregation architecture 225 of FIG. 10 may be the primary signal splitting carrier aggregation architecture 225 of FIG. 2. The primary antenna 206 may be used to receive signals on two low band carriers. The routing 1031 from the primary antenna 206 through the primary receiver (PRx) 234 to obtain the first PRx inphase/quadrature (I/Q) signal 214 is shown. The first PRx inphase/quadrature (I/Q) signal 214 may include one of the low band carriers for this configuration.

The routing 1045 from the primary antenna 206 through the secondary receiver (SRx) 236 to obtain the first SRx inphase/quadrature (I/Q) signal 216 is also shown. The first SRx inphase/quadrature (I/Q) signal 216 may include the other low band carrier for this configuration. The routing 1045 from the primary antenna 206 through the secondary receiver (SRx) 236 to obtain the first SRx inphase/quadrature (I/Q) signal 216 may pass through a signal splitting stage 1033. The signal splitting stage 1033 may take the signal from the first low band (LB1) low noise amplifier (LNA) 240*a* in the primary receiver (PRx) 234 after the transconductance stage (Gm) 244*a* and route the signal to the cascode stage (Cas) 246*e* of the first low band (LB1) low noise amplifier (LNA) 240*c* in the secondary receiver (SRx) 236. In another configuration (not shown), the signal splitting stage 1033 may take the signal input to the first low band (LB1) low noise amplifier (LNA) 240*a* in the primary receiver (PRx) 234 and route the signal to the transconductance stage (Gm) 244*e* of the first low band (LB1) low noise amplifier (LNA) 240*c* in the secondary receiver (SRx) 236. The signal splitting stage 1033 is discussed in additional detail below in relation to FIG. 13 and FIG. 14. The routing 1029 from the transmitter 232 to the primary antenna 206 is also shown.

Figure 11:
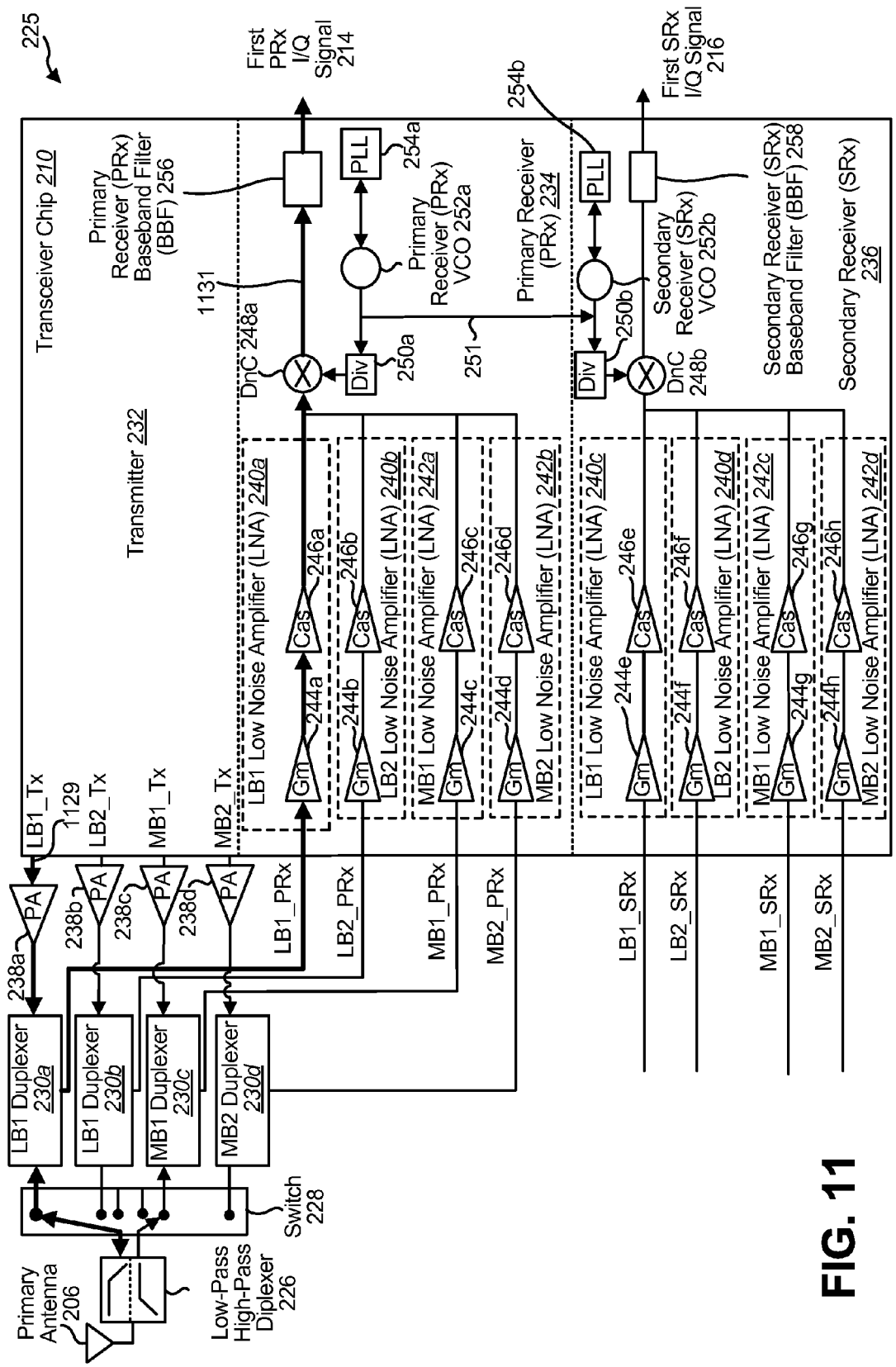
FIG. 11 is a block diagram illustrating a primary signal splitting carrier aggregation architecture operating in diversity mode.

FIG. 11 is a block diagram illustrating a primary signal splitting carrier aggregation architecture 225 operating in diversity mode. The primary signal splitting carrier aggregation architecture 225 of FIG. 10 may be the primary signal splitting carrier aggregation architecture 225 of FIG. 2. The primary antenna 206 may be used to receive signals on a low band carrier. The routing 1131 from the primary antenna 206 through the primary receiver (PRx) 234 to obtain the first PRx inphase/quadrature (I/Q) signal 214 is shown. The first PRx inphase/quadrature (I/Q) signal 214 may include the low band carrier for this configuration. The routing 1129 from the transmitter 232 to the primary antenna 206 is also shown. In diversity mode, no routing is used through the secondary receiver (SRx) 236. However, in diversity mode, two synthesizers may need to be run instead of one; this may lead to higher power consumption in diversity mode.

Figure 12:
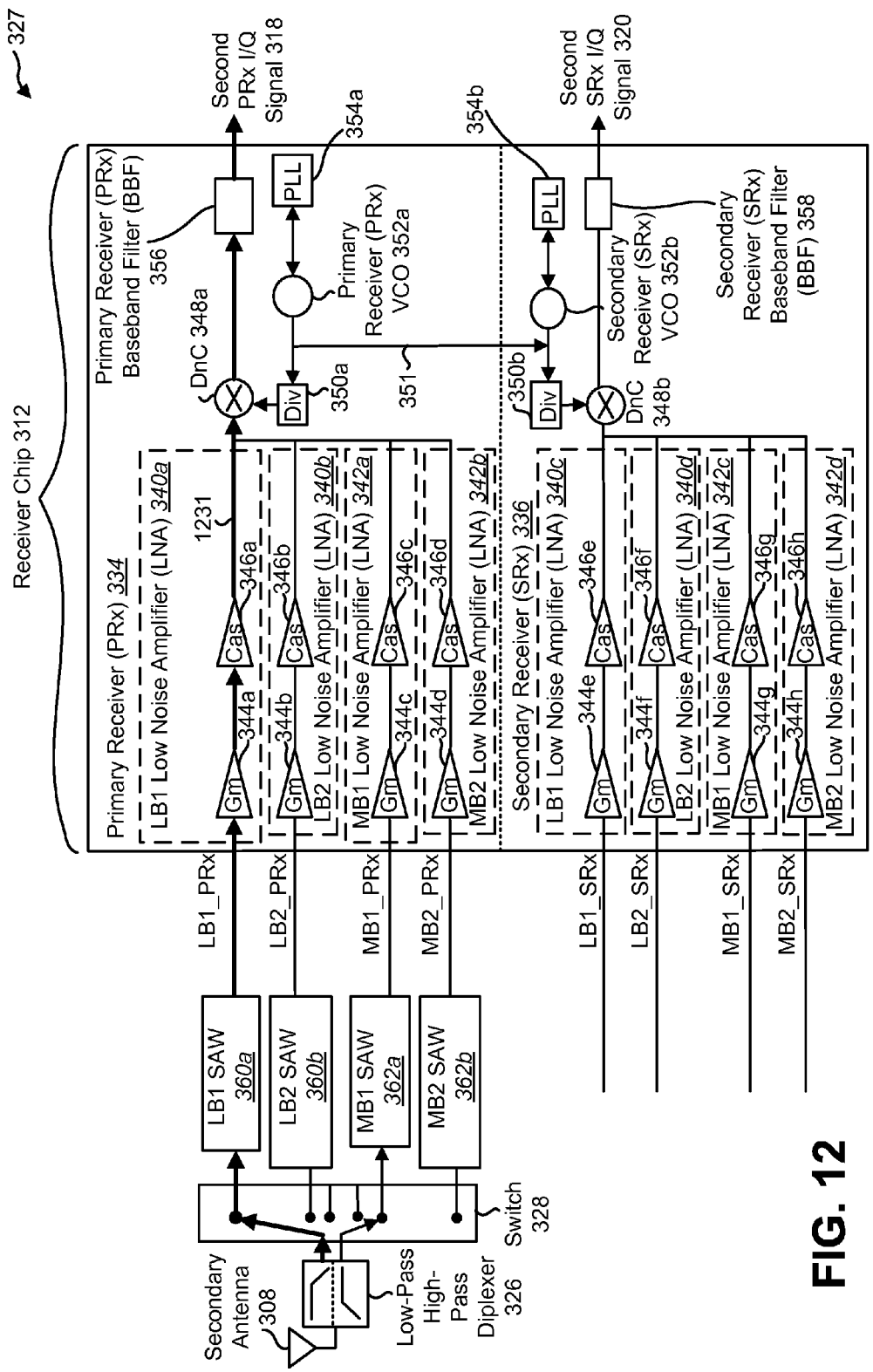
FIG. 12 is a block diagram illustrating a secondary signal splitting carrier aggregation architecture operating in diversity mode.

FIG. 12 is a block diagram illustrating a secondary signal splitting carrier aggregation architecture 327 operating in diversity mode. The secondary signal splitting carrier aggregation architecture 327 of FIG. 12 may be the secondary signal splitting carrier aggregation architecture 327 of FIG. 3. The secondary antenna 308 may be used to receive signals on a low band carrier. The routing 1231 from the secondary antenna 308 through the primary receiver (PRx) 334 to obtain the second PRx inphase/quadrature (I/Q) signal 318 is shown. The second PRx inphase/quadrature (I/Q) signal 318 may include the low band carrier for this configuration. In diversity mode, no routing is used through the secondary receiver (SRx) 336.

Figure 13:
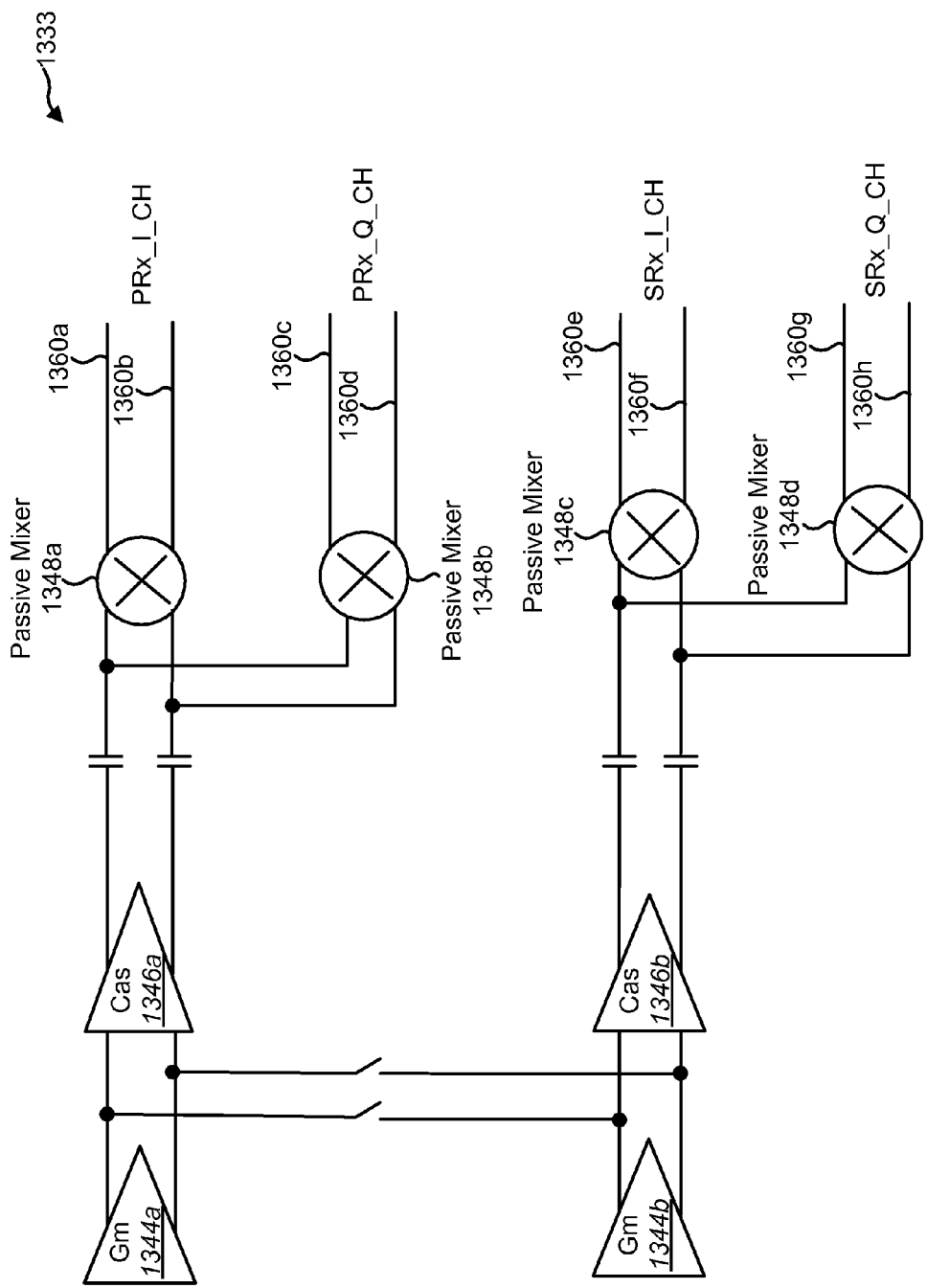
FIG. 13 is a block diagram illustrating a signal splitting stage.

FIG. 13 is a block diagram illustrating a signal splitting stage 1333. The signal splitting stage 1333 of FIG. 13 may be one configuration of the signal splitting stage 533 in FIG. 5, the signal splitting stage 633 in FIG. 6, the signal splitting stage 733 in FIG. 7, the signal splitting stage 833 in FIG. 8, the signal splitting stage 933 in FIG. 9 and the signal splitting stage 1033 in FIG. 10. The signal splitting stage 1333 may include a first transconductance stage (Gm) 1344*a*, a first cascode stage (Cas) 1346*a*, a second transconductance stage (Gm) 1344*b*, a second cascode stage (Cas) 1346*b* and passive mixers 1348*a-d*. The first transconductance stage (Gm) 1344*a* and the first cascode stage (Cas) 1346*a* may be part of a low noise amplifier (LNA) on a primary receiver (PRx) while the second transconductance stage (Gm) 1344*b* and the second cascode stage (Cas) 1346*b* may be part of a low noise amplifier (LNA) on a secondary receiver (SRx).

The outputs of the first transconductance stage (Gm) 1344*a* may be input to the first cascode stage (Cas) 1346*a*. The outputs of the first cascode stage (Cas) 1346*a* may then be mixed via the passive mixers 1348*a-b* to obtain the primary receiver (PRx) inphase signal PRx_I_CH 1360*a-b* and the primary receiver (PRx) quadrature signal PRx_Q_CH 1360*c-d* of a primary receiver (PRx) signal. In the signal splitting stage 1333, the signal splitting occurs after the first transconductance stage (Gm) 1344*a*. Thus, the outputs of the first transconductance stage (Gm) 1344*a* may be input to the inputs of the second cascode stage (Cas) 1346*b*. The outputs of the second cascode stage (Cas) 1346*b* may then be mixed via the passive mixers 1348*c-d* to obtain the secondary receiver (SRx) inphase signal SRx_I_CH 1360*e-f* and the secondary receiver (SRx) quadrature signal SRx_Q_CH 1360*g-h* of a secondary receiver (SRx) signal.

Switches may be used between the primary receiver (PRx) and the secondary receiver (SRx) to allow a clean standalone operation. The low noise amplifier (LNA) topology may drive the signal splitting sensing point.

Figure 14:
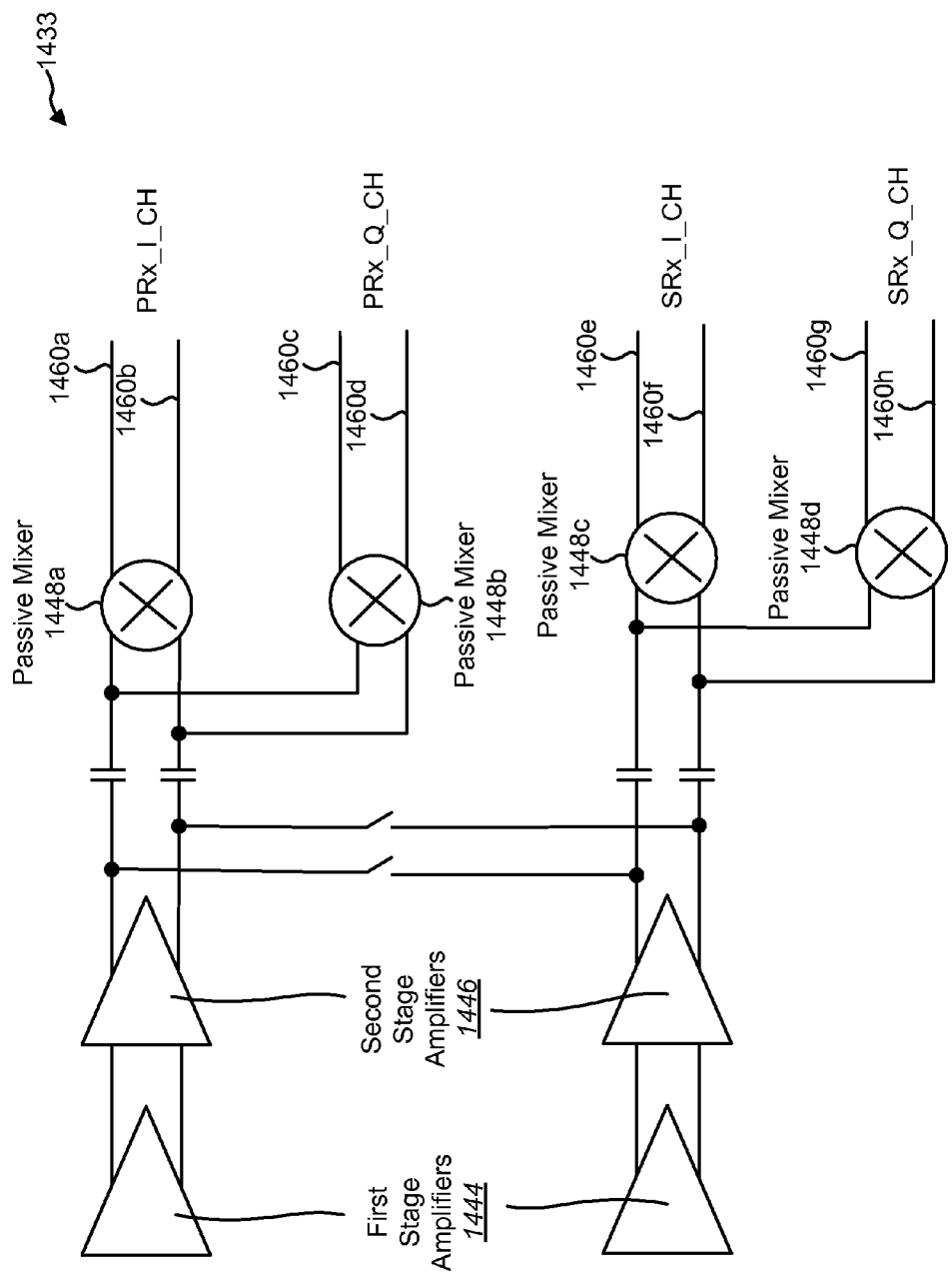
FIG. 14 is a block diagram illustrating another signal splitting stage.

FIG. 14 is a block diagram illustrating another signal splitting stage. The signal splitting stage 1433 of FIG. 14 may be one configuration of the signal splitting stage 533 in FIG. 5, the signal splitting stage 633 in FIG. 6, the signal splitting stage 733 in FIG. 7, the signal splitting stage 833 in FIG. 8, the signal splitting stage 933 in FIG. 9 and the signal splitting stage 1033 in FIG. 10. The signal splitting stage 1433 may include a set of first stage amplifiers 1444, second stage amplifiers 1446 and passive mixers 1448*a-d*. The first stage amplifiers 1444 of FIG. 14 may be one configuration of the transconductance stages (GM) 244, 344 of FIG. 2 and FIG. 3. In one configuration, the second stage amplifiers 1446 may be cascode stages (such as the cascode stages 246 illustrated in FIG. 2 and the cascode stages 346 illustrated in FIG. 3). The upper first stage amplifier 1444 and the upper second stage amplifier 1446 may be part of a low noise amplifier (LNA) on a primary receiver (PRx) while the lower first stage amplifier 1444 and the lower second stage amplifier 1446 may be part of a low noise amplifier (LNA) on a secondary receiver (SRx).

The outputs of the upper first stage amplifier 1444 may be input to the upper second stage amplifier 1446. The outputs of the upper second stage amplifier 1446 may then be mixed via the passive mixers 1448a-b to obtain the primary receiver (PRx) inphase signal PRx_I_CH 1460a-b and the primary receiver (PRx) quadrature signal PRx_Q_CH 1460c-d of a primary receiver (PRx) signal. In the signal splitting stage 1433, the signal splitting occurs after the upper second stage amplifier 1446. Thus, the outputs of the upper second stage amplifier 1446 may be input to the passive mixers 1448c-d of the secondary receiver (SRx) to obtain the secondary receiver (SRx) inphase signal SRx_I_CH 1460e-f and the secondary receiver (SRx) quadrature signal SRx_Q_CH 1460g-h of a secondary receiver (SRx) signal.

Figure 15:
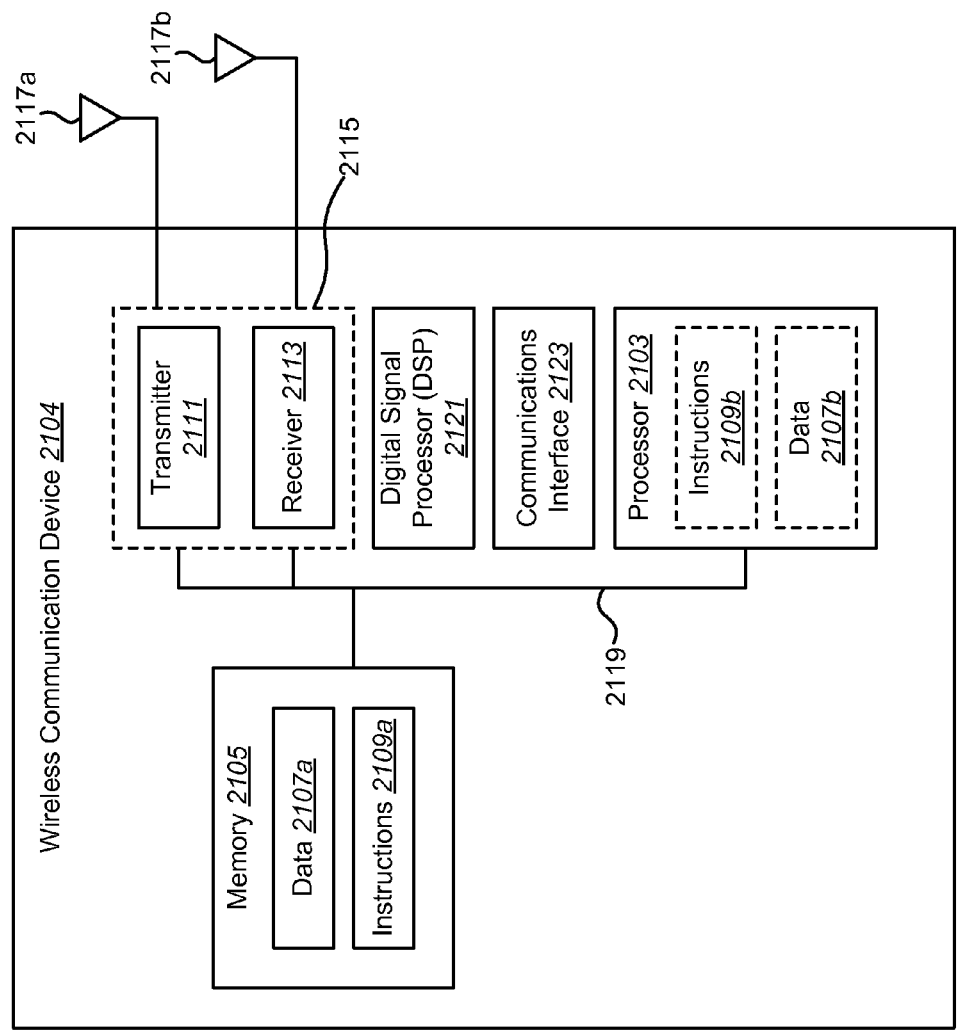
FIG. 15 illustrates certain components that may be included within a wireless communication device.

FIG. 15 illustrates certain components that may be included within a wireless communication device 2104. The wireless communication device 2104 may be an access terminal, a mobile station, a user equipment (UE), etc. The wireless communication device 2104 includes a processor 2103. The processor 2103 may be a general purpose single- or multi-chip microprocessor (e.g., an ARM), a special purpose microprocessor (e.g., a digital signal processor (DSP)), a microcontroller, a programmable gate array, etc. The processor 2103 may be referred to as a central processing unit (CPU). Although just a single processor 2103 is shown in the wireless communication device 2104 of FIG. 15, in an alternative configuration, a combination of processors (e.g., an ARM and DSP) could be used.

The wireless communication device 2104 also includes memory 2105. The memory 2105 may be any electronic component capable of storing electronic information. The memory 2105 may be embodied as random access memory (RAM), read-only memory (ROM), magnetic disk storage media, optical storage media, flash memory devices in RAM, on-board memory included with the processor, EPROM memory, EEPROM memory, registers and so forth, including combinations thereof.

Data 2107a and instructions 2109a may be stored in the memory 2105. The instructions 2109a may be executable by the processor 2103 to implement the methods disclosed herein. Executing the instructions 2109a may involve the use of the data 2107a that is stored in the memory 2105. When the processor 2103 executes the instructions 2109, various portions of the instructions 2109b may be loaded onto the processor 2103, and various pieces of data 2107b may be loaded onto the processor 2103.

The wireless communication device 2104 may also include a transmitter 2111 and a receiver 2113 to allow transmission and reception of signals to and from the wireless communication device 2104 via a first antenna 2117a and a second antenna 2117b. The transmitter 2111 and receiver 2113 may be collectively referred to as a transceiver 2115. The wireless communication device 2104 may also include (not shown) multiple transmitters, additional antennas, multiple receivers and/or multiple transceivers.

The wireless communication device 2104 may include a digital signal processor (DSP) 2121. The wireless communication device 2104 may also include a communications interface 2123. The communications interface 2123 may allow a user to interact with the wireless communication device 2104.

The various components of the wireless communication device 2104 may be coupled together by one or more buses, which may include a power bus, a control signal bus, a status signal bus, a data bus, etc. For the sake of clarity, the various buses are illustrated in FIG. 15 as a bus system 2119.

The term "determining" encompasses a wide variety of actions and, therefore, "determining" can include calculating, computing, processing, deriving, investigating, looking up (e.g., looking up in a table, a database or another data structure), ascertaining and the like. Also, "determining" can include receiving (e.g., receiving information), accessing (e.g., accessing data in a memory) and the like. Also, "determining" can include resolving, selecting, choosing, establishing and the like.

The phrase "based on" does not mean "based only on," unless expressly specified otherwise. In other words, the phrase "based on" describes both "based only on" and "based at least on."

The term "processor" should be interpreted broadly to encompass a general purpose processor, a central processing unit (CPU), a microprocessor, a digital signal processor (DSP), a controller, a microcontroller, a state machine and so forth. Under some circumstances, a "processor" may refer to an application specific integrated circuit (ASIC), a programmable logic device (PLD), a field programmable gate array (FPGA), etc. The term "processor" may refer to a combination of processing devices, e.g., a combination of a DSP and a microprocessor, a plurality of microprocessors, one or more microprocessors in conjunction with a DSP core, or any other such configuration.

The term "memory" should be interpreted broadly to encompass any electronic component capable of storing electronic information. The term memory may refer to various types of processor-readable media such as random access memory (RAM), read-only memory (ROM), non-volatile random access memory (NVRAM), programmable read-only memory (PROM), erasable programmable read-only memory (EPROM), electrically erasable PROM (EEPROM), flash memory, magnetic or optical data storage, registers, etc. Memory is said to be in electronic communication with a processor if the processor can read information from and/or write information to the memory. Memory that is integral to a processor is in electronic communication with the processor.

The terms "instructions" and "code" should be interpreted broadly to include any type of computer-readable statement(s). For example, the terms "instructions" and "code" may refer to one or more programs, routines, sub-routines, functions, procedures, etc. "Instructions" and "code" may comprise a single computer-readable statement or many computer-readable statements.

The functions described herein may be implemented in hardware, software, firmware, or any combination thereof. If implemented in software, the functions may be stored as one or more instructions on a computer-readable medium. The terms "computer-readable medium" or "computer-program product" refers to any available medium that can be accessed by a computer. By way of example, and not limitation, a computer-readable medium may comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Disk and disc, as used herein, includes compact disc (CD), laser disc, optical disc, digital versatile disc (DVD), floppy disk and Blu-ray® disc where disks usually reproduce data magnetically, while discs reproduce data optically with lasers.

Software or instructions may also be transmitted over a transmission medium. For example, if the software is transmitted from a website, server, or other remote source using a coaxial cable, fiber optic cable, twisted pair, digital subscriber line (DSL), or wireless technologies such as infrared, radio and microwave, then the coaxial cable, fiber optic cable, twisted pair, DSL, or wireless technologies such as infrared, radio and microwave are included in the definition of transmission medium.

The methods disclosed herein comprise one or more steps or actions for achieving the described method. The method steps and/or actions may be interchanged with one another without departing from the scope of the claims. In other words, unless a specific order of steps or actions is required for proper operation of the method that is being described, the order and/or use of specific steps and/or actions may be modified without departing from the scope of the claims.

Further, it should be appreciated that modules and/or other appropriate means for performing the methods and techniques described herein, such as those illustrated by FIG. 4, can be downloaded and/or otherwise obtained by a device. For example, a device may be coupled to a server to facilitate the transfer of means for performing the methods described herein. Alternatively, various methods described herein can be provided via a storage means (e.g., random access memory (RAM), read-only memory (ROM), a physical storage medium such as a compact disc (CD) or floppy disk, etc.), such that a device may obtain the various methods upon coupling or providing the storage means to the device. Moreover, any other suitable technique for providing the methods and techniques described herein to a device can be utilized.

It is to be understood that the claims are not limited to the precise configuration and components illustrated above. Various modifications, changes and variations may be made in the arrangement, operation and details of the systems, methods and apparatus described herein without departing from the scope of the claims.

What is claimed is:

1. A wireless communication device configured for receiving a multiple carrier signal, comprising:
   a primary signal splitting carrier aggregation architecture comprising:
      a primary antenna;
      a transceiver chip comprising a first primary receiver and a first secondary receiver, the transceiver chip configured for both carrier aggregation operation and diversity/simultaneous hybrid dual receiver operation; and
      routing configured to route a signal split from a signal received from the primary antenna into a first primary signal and a first secondary signal, the routing further configured to route the first secondary signal to the first secondary receiver from a path within the first primary receiver; and
   a secondary signal splitting carrier aggregation architecture comprising:
      a secondary antenna;
      a receiver chip comprising a second primary receiver and a second secondary receiver, the receiver chip configured for both carrier aggregation operation and diversity/simultaneous hybrid dual receiver operation:
      routing configured to route a signal received from the secondary antenna to the second primary receiver and the second secondary receiver.

2. The wireless communication device of claim 1, wherein the primary signal splitting carrier aggregation architecture and the secondary signal splitting carrier aggregation architecture do not require four antennas, a power splitter, an external low noise amplifier or die-to-die signal routing.

3. The wireless communication device of claim 1, wherein the transceiver chip comprises:
   a transmitter;
   wherein each receiver comprises multiple low noise amplifiers for a first band and multiple low noise amplifiers for a second band, and wherein each low noise amplifier comprises a first stage amplifier and a second stage amplifier.

4. The wireless communication device of claim 3, wherein the first stage amplifier is a transconductance stage, and wherein the second stage amplifier is a cascode stage.

5. The wireless communication device of claim 3, wherein the first band is a low band and the second band is a mid band.

6. The wireless communication device of claim 3, wherein the first band is a low band and the second band is a high band.

7. The wireless communication device of claim 3, wherein the first band is a mid band and the second band is a high band.

8. The wireless communication device of claim 3, wherein:
   the routing configured to route a signal split from a signal received from the primary antenna further comprises:
      a first routing from the primary antenna through the first primary receiver to obtain the first primary signal comprising a first primary inphase/quadrature signal; and
      a second routing from the first primary receiver through the first secondary receiver to obtain the first secondary signal comprising a first secondary inphase/quadrature signal; and
   the routing configured to route a signal received from the secondary antenna further comprises:
      a third routing is used from the secondary antenna through the second primary receiver to obtain a second primary inphase/quadrature signal; and
      a fourth routing is used from the secondary antenna through the second secondary receiver to obtain a second secondary inphase/quadrature signal.

9. The wireless communication device of claim 8, wherein the primary signal splitting carrier aggregation architecture and the secondary signal splitting carrier aggregation architecture are in inter-band operation, wherein the second routing passes through a first signal splitting stage, and wherein the fourth routing passes through a second signal splitting stage.

10. The wireless communication device of claim 9, wherein the first signal splitting stage routes a signal output from a first stage amplifier in a first band low noise amplifier of the first primary receiver to a second stage amplifier in a second band low noise amplifier of the first secondary receiver.

11. The wireless communication device of claim 9, wherein the second signal splitting stage routes a signal output from a first stage amplifier in a first band low noise amplifier of the second primary receiver to a second stage amplifier in a second band low noise amplifier of the second secondary receiver.

12. The wireless communication device of claim 9, wherein the first signal splitting stage routes a signal output from a second stage amplifier in a first band low noise amplifier of the first primary receiver to a mixer in the first secondary receiver.

13. The wireless communication device of claim 9, wherein the second signal splitting stage routes a signal output from a second stage amplifier in a first band low noise amplifier of the second primary receiver to a mixer in the second secondary receiver.

14. The wireless communication device of claim 8, wherein the primary signal splitting carrier aggregation architecture and the secondary signal splitting carrier aggregation architecture are in intra-band operation, wherein the second routing passes through a first signal splitting stage, and wherein the fourth routing passes through a second signal splitting stage.

15. The wireless communication device of claim 14, wherein the first signal splitting stage splits a signal output from a first stage amplifier in a first band low noise amplifier of the first primary receiver, routes the signal to a second stage amplifier in the first band low noise amplifier of the first primary receiver and routes the signal to a second stage amplifier in a second band low noise amplifier of the first secondary receiver.

16. The wireless communication device of claim 14, wherein the second signal splitting stage splits a signal output from a first stage amplifier in a first band low noise amplifier of the second primary receiver, routes the signal to a second stage amplifier in the first band low noise amplifier of the second primary receiver and routes the signal to a second stage amplifier in a second band low noise amplifier of the second secondary receiver.

17. The wireless communication device of claim 14, wherein the first signal splitting stage splits a signal output from a second stage amplifier in a first band low noise amplifier of the first primary receiver, routes the signal to a first mixer of the first primary receiver and routes the signal to a second mixer of the second primary receiver.

18. The wireless communication device of claim 14, wherein the second signal splitting stage splits a signal output from a second stage amplifier in a first band low noise amplifier of the second primary receiver, routes the signal to a first mixer of the second primary receiver and routes the signal to a second mixer of the second primary receiver.

19. A method for receiving a multiple carrier signal using a primary signal splitting carrier aggregation architecture and a secondary signal splitting carrier aggregation architecture, comprising:
    receiving a first signal using a primary antenna;
    routing the first signal through a first primary receiver on a transceiver chip in the primary signal splitting carrier aggregation architecture to obtain a first primary inphase/quadrature signal, wherein the transceiver chip is configured for both carrier aggregation operation and diversity/simultaneous hybrid dual receiver operation;
    routing the first signal through a path within the first primary receiver to a first secondary receiver on the transceiver chip to obtain a first secondary inphase/quadrature signal;
    receiving a second signal using a secondary antenna;
    routing the second signal through a second primary receiver on a receiver chip in the secondary signal splitting carrier aggregation architecture to obtain a second primary inphase/quadrature signal, wherein the receiver chip is configured for both carrier aggregation operation and diversity/simultaneous hybrid dual receiver operation; and
    routing the second signal through a path within the second primary receiver to a second secondary receiver on the receiver chip to obtain a second secondary inphase/quadrature signal.

20. The method of claim 19, wherein the primary signal splitting carrier aggregation architecture and the secondary signal splitting carrier aggregation architecture do not require four antennas, a power splitter, an external low noise amplifier or die-to-die signal routing.

21. The method of claim 19, wherein each receiver comprises multiple low noise amplifiers for a first band and multiple low noise amplifiers for a second band, and wherein each low noise amplifier comprises a first stage amplifier and a second stage amplifier.

22. The method of claim 21, wherein the first stage amplifier is a transconductance stage, and wherein the second stage amplifier is a cascode stage.

23. The method of claim 21, wherein the first band is a low band and the second band is a mid band.

24. The method of claim 21, wherein the first band is a low band and the second band is a high band.

25. The method of claim 21, wherein the first band is a mid band and the second band is a high band.

26. The method of claim 21, wherein a first routing is used from the primary antenna through the first primary receiver to obtain the first primary inphase/quadrature signal, wherein the path within the first primary receiver comprises a second routing from the primary antenna through the first secondary receiver to obtain the first secondary inphase/quadrature signal, wherein a third routing is used from the secondary antenna through the second primary receiver to obtain the second primary inphase/quadrature signal, and wherein the path within the second primary receiver comprises a fourth routing from the secondary antenna through the second secondary receiver to obtain a second secondary inphase/quadrature signal.

27. The method of claim 26, wherein the primary signal splitting carrier aggregation architecture and the secondary signal splitting carrier aggregation architecture are in interband operation, wherein the second routing passes through a first signal splitting stage, and wherein the fourth routing passes through a second signal splitting stage.

28. The method of claim 27, wherein the first signal splitting stage routes a signal output from a first stage amplifier in a first band low noise amplifier of the first primary receiver to a second stage amplifier in a second band low noise amplifier of the first secondary receiver.

29. The method of claim 27, wherein the second signal splitting stage routes a signal output from a first stage amplifier in a first band low noise amplifier of the second primary receiver to a second stage amplifier in a second band low noise amplifier of the second secondary receiver.

30. The method of claim 27, wherein the first signal splitting stage routes a signal output from a second stage amplifier in a first band low noise amplifier of the first primary receiver to a mixer in the first secondary receiver.

31. The method of claim 27, wherein the second signal splitting stage routes a signal output from a second stage amplifier in a first band low noise amplifier of the second primary receiver to a mixer in the second secondary receiver.

32. The method of claim 26, wherein the primary signal splitting carrier aggregation architecture and the secondary signal splitting carrier aggregation architecture are in intraband operation, wherein the second routing passes through a first signal splitting stage, and wherein the fourth routing passes through a second signal splitting stage.

33. The method of claim 32, wherein the first signal splitting stage splits a signal output from a first stage amplifier in a first band low noise amplifier of the first primary receiver, routes the signal to a second stage amplifier in the first band low noise amplifier of the first primary receiver and routes the signal to a second stage amplifier in a second band low noise amplifier of the first secondary receiver.

34. The method of claim 32, wherein the second signal splitting stage splits a signal output from a first stage amplifier in a first band low noise amplifier of the second primary receiver, routes the signal to a second stage amplifier in the first band low noise amplifier of the second primary receiver and routes the signal to a second stage amplifier in a second band low noise amplifier of the second secondary receiver.

35. The method of claim 32, wherein the first signal splitting stage splits a signal output from a second stage amplifier in a first band low noise amplifier of the first primary receiver, routes the signal to a first mixer of the first primary receiver and routes the signal to a second mixer of the second primary receiver.

36. The method of claim 32, wherein the second signal splitting stage splits a signal output from a second stage amplifier in a first band low noise amplifier of the second primary receiver, routes the signal to a first mixer of the second primary receiver and routes the signal to a second mixer of the second primary receiver.

37. An apparatus for receiving a multiple carrier signal using a primary signal splitting carrier aggregation architecture and a secondary signal splitting carrier aggregation architecture, comprising:
- means for receiving a first signal using a primary antenna;
- means for routing the first signal through a first primary receiver on a transceiver chip in the primary signal splitting carrier aggregation architecture to obtain a first primary inphase/quadrature signal, wherein the transceiver chip is configured for both carrier aggregation operation and diversity/simultaneous hybrid dual receiver operation;
- means for routing the first signal through a path within the first primary receiver to a first secondary receiver on the transceiver chip to obtain a first secondary inphase/quadrature signal;
- means for receiving a second signal using a secondary antenna;
- means for routing the second signal through a second primary receiver on a receiver chip in the secondary signal splitting carrier aggregation architecture to obtain a second primary inphase/quadrature signal, wherein the receiver chip is configured for both carrier aggregation operation and diversity/simultaneous hybrid dual receiver operation; and
- means for routing the second signal through a path within the second primary receiver to a second secondary receiver on the receiver chip to obtain a second secondary inphase/quadrature signal.

38. The apparatus of claim 37, wherein the primary signal splitting carrier aggregation architecture and the secondary signal splitting carrier aggregation architecture do not require four antennas, a power splitter, an external low noise amplifier or die-to-die signal routing.

39. The apparatus of claim 37, wherein each receiver comprises multiple low noise amplifiers for a first band and multiple low noise amplifiers for a second band, and wherein each low noise amplifier comprises a first stage and a second stage.

40. The apparatus of claim 39, wherein a first routing is used from the primary antenna through the first primary receiver to obtain the first primary inphase/quadrature signal, wherein the path within the first primary receiver comprises a second routing from the primary antenna through the first secondary receiver to obtain the first secondary inphase/quadrature signal, wherein a third routing is used from the secondary antenna through the second primary receiver to obtain the second primary inphase/quadrature signal, and wherein the path within the secondary primary receiver comprises a fourth routing from the secondary antenna through the second secondary receiver to obtain a second secondary inphase/quadrature signal.

* * * * *